United States Patent
Hsieh et al.

(10) Patent No.: US 7,693,012 B2
(45) Date of Patent: Apr. 6, 2010

(54) APPARATUS FOR DEMODULATING ADDRESS IN PRE-GROOVE SYMBOLS AND APPARATUS FOR DECODING PRE-PIT SYMBOLS

(75) Inventors: Bing-Yu Hsieh, Taipei (TW); Yuh Cheng, Hsin-Chu County (TW); Shu-Hung Chou, Taipei County (TW); Jung-Feng Ho, Keelung (TW)

(73) Assignee: Mediatek Inc., Hsin-Chu (TW)

( * ) Notice: Subject to any disclaimer, the term of this patent is extended or adjusted under 35 U.S.C. 154(b) by 297 days.

(21) Appl. No.: 11/755,237

(22) Filed: May 30, 2007

(65) Prior Publication Data

US 2007/0280072 A1    Dec. 6, 2007

Related U.S. Application Data

(60) Provisional application No. 60/803,877, filed on Jun. 5, 2006, provisional application No. 60/811,016, filed on Jun. 5, 2006, provisional application No. 60/810,970, filed on Jun. 5, 2006, provisional application No. 60/811,023, filed on Jun. 5, 2006, provisional application No. 60/811,020, filed on Jun. 5, 2006.

(51) Int. Cl.
*G11B 7/00* (2006.01)

(52) U.S. Cl. .............. 369/44.13; 369/44.29; 369/44.35; 369/124.1

(58) Field of Classification Search .................. None
See application file for complete search history.

(56) References Cited

U.S. PATENT DOCUMENTS

| 6,985,543 B1 | 1/2006 | Sutardja |
| 7,310,296 B2 * | 12/2007 | Dai .......................... 369/59.19 |

2004/0120238 A1    6/2004    Chen et al.

(Continued)

FOREIGN PATENT DOCUMENTS

JP    200648880    2/2006

(Continued)

OTHER PUBLICATIONS

English Abstract and Partial Translation of JP200648880.

(Continued)

*Primary Examiner*—Muhammad N. Edun
(74) *Attorney, Agent, or Firm*—Thomas, Kayden, Horstemeyer & Risley

(57) ABSTRACT

The invention provides an apparatus for demodulating an Address In Pre-groove (ADIP) symbol. The ADIP symbol is carried by a wobble signal of an optical disk and comprises a series of ADIP bits permuted according to one of a plurality of permutation patterns to make up the ADIP symbol. A wobble extraction module extracts the wobble signal from the optical disk. A reference wobble generator generates a reference wobble with the same frequency and phase as a fundamental frequency and phase of a positive wobble cycle of the wobble signal. A waveform difference measurement module then measures a difference between the wobble signal and the reference wobble to obtain a series of difference measurement values respectively corresponding to the ADIP bits. A pattern matching module then compares probabilities of the permutation of the ADIP bits agreeing with each of the permutation patterns according to the difference measurement values to determine the ADIP symbol.

20 Claims, 36 Drawing Sheets

U.S. PATENT DOCUMENTS

| | | | |
|---|---|---|---|
| 2004/0252608 A1 | 12/2004 | Park et al. | |
| 2005/0025009 A1 | 2/2005 | Ono | |
| 2005/0041563 A1 | 2/2005 | Tawaragi et al. | |
| 2005/0243681 A1 | 11/2005 | Yen | |
| 2006/0018229 A1* | 1/2006 | Senba | 369/59.1 |
| 2006/0044961 A1* | 3/2006 | Jin | 369/44.13 |

FOREIGN PATENT DOCUMENTS

| | | |
|---|---|---|
| WO | WO2005015548 | 2/2005 |

OTHER PUBLICATIONS

CN Office Action mailed Aug. 1, 2008.

* cited by examiner

|  | B2 | B1 | B0 |
|---|---|---|---|
| Pre-pit SYNC in Even frame | 1 | 1 | 1 |
| Pre-pit SYNC in Odd frame | 1 | 1 | 0 |
| Pre-pit DATA 1 | 1 | 0 | 1 |
| Pre-pit DATA 0 | 1 | 0 | 0 |

APPARATUS FOR DEMODULATING ADDRESS IN PRE-GROOVE SYMBOLS AND APPARATUS FOR DECODING PRE-PIT SYMBOLS

CROSS REFERENCE TO RELATED APPLICATIONS

This application claims the benefit of U.S. Provisional Application No. 60/803,877, filed Jun. 5, 2006, U.S. Provisional Application No. 60/811,016, filed Jun. 5, 2006, U.S. Provisional Application No. 60/810,970, filed Jun. 5, 2006, U.S. Provisional Application No. 60/811,023, filed Jun. 5, 2006, and U.S. Provisional Application No. 60/811,020, filed Jun. 5, 2006.

BACKGROUND OF THE INVENTION

1. Field of the Invention

The invention relates to optical disk drives, and more particularly to processing of wobble signals thereof.

2. Description of the Related Art

The data of Digital Versatile Disks (DVD) and Compact Disks (CD) are encoded and recorded on a single spiral track covering the surface of the disks. If the optical medium is recordable, this spiral track contains a slight sinusoidal deviation from a perfect spiral, wherein the sinusoidal deviation is used to encode modulated address information and referred to as a "wobble signal". The frequency of the sine curve of the wobble signal is the wobble carrier frequency, and each format of optical disk has the same or different carrier frequency. For example, DVD-R or DVD RAM have wobble carrier frequency of 140.6 kHz, and DVD+R has a wobble frequency of 817.4 kHz.

To extract data recorded on the optical disk, the optical disk drive first detect the wobble signal on the optical disk with a wobble detection circuit. The design of the wobble detection circuit can thus greatly affect performance of an optical disk drive. An optical disk drive reads the wobble signal by detecting the reflection strength of a laser beam moved along the spiral track. FIGS. 1a~1d are the signals detected by a pick-up head of the optical disk drive. FIG. 1a is a wobble signal without data information recorded thereon, and the waveform of the wobble signal is like a sinusoidal wave. After data information is recorded on disk, the wobble signal is no longer a sinusoidal wave. An ordinary pick-up head scans a track with four photodetectors A, B, C, and D simultaneously. FIGS. 1b and 1c respectively show the exemplary synthesized signals $S_{AD}$ and $S_{BC}$ with recorded data waveform, wherein the signal of FIG. 1b is detected by photodetectors A and D and designated as signal $S_{AD}$, and the signal of FIG. 1c is detected by photodetectors B and C and designated as signal $S_{BC}$. Because the wobble carrier components of the signals $S_{AD}$ and $S_{BC}$ are phase-inverted, the recorded data information is obtained by adding signals $S_{AD}$ and $S_{BC}$. The wobble carrier component is obtained by subtracting amplified signal of $S_{BC}$ from amplified signal of $S_{AD}$, as shown in FIG. 1d. The subtraction signal is a wobble signal with uncanceled high frequency noise.

FIG. 2 is a block diagram of a conventional wobble detection circuit 200 detecting an absolute time in pre-groove (ATIP) information. ATIP is a method for modulating address information of wobble signals of optical disks such as CD-R or CD-RW. Because only a portion of a wobble signal $W_0$ within a frequency range carries significant information, a band pass filter 202 first filters the wobble signal $W_0$ to obtain a filtered wobble signal $W_1$. An analog to digital converter 204 then converts the analog filtered wobble signal $W_1$ to a digital wobble signal D. An ATIP detector 206 then extracts ATIP information from the digital wobble signal D, and a phase locked loop 208 locks the phase of the digital wobble signal D to obtain a clock signal [not shown] with the same frequency as the digital wobble signal D.

FIG. 3 is a block diagram of a conventional wobble detection circuit 300 detecting an address in pre-groove (ADIP) information. ADIP is generated by modulating address information of wobble signals of optical disks such as DVD+R or DVD+RW. Because only a portion of a wobble signal $W_0$ within a frequency range carries significant information, a band pass filter 302 and a low pass filter 312 respectively filter the wobble signal $W_0$ to obtain filtered wobble signals $W_2$ and $W_1$. Analog to digital converters 304 and 314 then convert the analog filtered wobble signal $W_2$ and $W_1$ to digital wobble signals $D_2$ and $D_1$. An ADIP detector 306 then extracts ADIP information from the digital wobble signal $D_1$, and a phase locked loop 308 locks the phase of the wobble signal $D_2$ to obtain a clock signal [not shown] with the same frequency as the digital wobble signal $D_2$.

The band pass filter 202 of FIG. 2 and the band pass filter 302 of FIG. 3 are analog band pass filters. Analog band pass filters have complex circuit structure and require significant chip area to accommodate the circuits thereof. The chip area occupied by a conventional analog band pass filter usually exceeds half of the total chip area of a wobble detection circuit. Additionally, analog band pass filters require high current for filtering the analog wobble signals, consuming considerable energy. Thus, a wobble detection circuit with a digital band pass filter is desirable.

FIG. 4 is a block diagram of a conventional circuit 400 for detecting the wobble carrier frequency. The wobble signal shown in FIG. 1d is first delivered to an automatic gain control module 402, which amplifies the wobble signal to an appropriate strength level. A band pass filter 404 processes the amplified wobble signal by filtering out undesirable out-band noise. The wobble signal is converted to a binary data stream by a binary converter 408 after the direct current (DC) offset of the processed wobble signal is canceled by a high-pass filter 406. Thus, the edge counting module 410 can first detect the edge then simply count the number of edge in a predetermined period to obtain the wobble carrier frequency.

The wobble carrier frequency obtained by the edge counting module 410, however, may be erroneous due to noise in the wobble signal shown in FIG. 1d. Although the band pass filter 404 filters out the noise of the wobble signal, not all of the noise is filtered out. The noise left in the wobble signal may interfere with conversion by the binary converter 408 thus generating an erroneous binary data stream. Thus, the wobble carrier frequency obtained by counting the edges of the erroneous binary data stream is also an erroneous wobble carrier frequency, which is difficult to detect accurate wobble frequency. In addition, the band pass filter 404 is an analog band pass filter, which is complicated and occupying a large chip area.

Significant information, such as address information, is pre-grooved on optical disks in the form of wobble signals. To extract address information from wobble signals, the wobble signals should be appropriately amplified to a predetermined signal level. Automatic gain controllers (AGC) are therefore used in wobble detection circuits to control gain for amplification of the input signals.

Conventional AGC of wobble detection circuits are analog circuits. The analog AGC, however, require capacitors to provide sufficient circuit capacitance to lower the bandwidth of the automatic gain controllers. Because on-chip capacitors with requisite high capacitance occupy considerable chip area, such capacitors are often located externally. Coupling between the analog automatic gain controllers and the external capacitors, however, requires extra IO pins, increasing the cost of PCB.

Some AGC of wobble detection circuits are implemented with digital circuits to avoid capacitance problems. FIG. 5 is a block diagram of a digital automatic gain controller 500. The digital automatic gain controller 500 includes an analog variable gain amplifier 510, an analog to digital converter (ADC) 504, an envelope detection module 502, a digital control module 506, and a digital to analog converter 508. The analog variable gain amplifier 510 amplifies an input signal digital $S_I$ according to a gain signal M' to obtain an amplified signal $S_I'$, which is converted to a digital signal So by ADC 504. The envelope detection module 502 then detects the envelope E of the digital signal So. The digital control module 506 then determines a gain signal M according to the envelope E, and the digital to analog converter converts the digital gain signal M to the analog gain signal M' to control amplification of the analog variable gain amplifier 510. Thus, the signal gain M of the digital automatic gain amplifier 500 is digitally determined by the digital control module 506 and does not require the high capacitance of analog automatic gain controllers.

Because the input signal $S_I$ contains high frequency noise which is induced by recorded data or write pulse, the frequency of the amplified signal $S_I'$ is as high as the frequency of the input signal $S_I$. To meet the requirement of Nyquist sampling theorem, the analog to digital converter 504 convert the amplified signal $S_I'$ to the digital signal $S_O$ with a sampling frequency higher than twice times of the highest frequency of recorded data frequency band. Additionally, signal resolution of the envelope E should be high enough that the digital control module 506 can finely adjust the gain signal M according to the envelope E. Thus, the analog to digital converter 504 generate the digital signal $S_O$ with high signal resolution. The high sampling rate and high signal resolution of the signals $S_O$, E, and M complicates signal processing and circuit structure of the analog to digital converter 504, the envelope detection module 502, the digital control module 506, and the digital to analog converter 508, greatly increasing the hardware cost of the digital automatic gain controller 500. Thus, a digital automatic gain controller with simpler signal processing is desirable.

There are different ways for addressing optical disks when data is written thereto. If an optical disk is DVD+R or DVD+RW, Address In Pre-groove (ADIP) information records the address of every track zone of the optical disks, allowing the optical disk drive to locate track zones during data recording. If an optical disk is DVD-R or DVD-RW, pre-pit information recorded on the land area of the optical disks is used for addressing track zones of the optical disks during data recording. Thus, a method for demodulating the ADIP information or decoding the pre-pit information is required for optical disk drives to record data onto the optical disks.

The ADIP information is modulated and recorded on the optical disk in the form of a wobble signal. According to DVD+R and DVD+RW specification, each data block of an optical disk includes 93 wobble cycles including eight wobble cycles for storing the ADIP information. Each of the eight wobble cycles can be a negative wobble with an inverted phase or a positive wobble with a normal phase, and different permutations of the eight wobble cycles represent different ADIP symbols. There are only three types of ADIP symbols, synch, data 0, and data 1, respectively represented by one permutation pattern of the negative and positive wobble cycles, wherein synch is an abbreviation for synchronous information.

FIG. 6A shows a wobble signal 610 carrying an ADIP synch symbol. The wobble signal 610 includes eight wobble cycles, comprising four negative wobble (NW) cycles followed by four positive wobble (PW) cycles. If a negative wobble cycle is converted to an ADIP bit 1 and a positive wobble cycle is converted to an ADIP bit 0, the wobble signal 610 is converted to a series of ADIP bits with the permutation of "11110000". FIGS. 6B and 6C show wobble signals 620 and 630, respectively carrying an ADIP data 0 symbol and an ADIP data 1 symbol. The wobble signal 620 includes eight wobble cycles, one negative wobble cycle followed by five positive wobble cycles further followed by two negative wobble cycles, and can be converted to a series of ADIP bits with the permutation of "10000011". Similarly, the wobble signal 630 includes eight wobble cycles, one negative wobble cycle followed by three positive wobble cycles followed by two negative wobble cycles further followed by two positive wobble cycles, and can be converted to a series of ADIP bits with the permutation of "10001100".

FIG. 7 shows a conventional process of demodulating a wobble signal carrying ADIP information into ADIP symbols. The wobble signal to be demodulated is shown in the second row of FIG. 7. A reference wobble with the same frequency and phase as a fundamental frequency and phase of the positive wobble cycle of the wobble signal is shown in the first row of FIG. 7, and the phase difference between the wobble signal and the reference wobble is measured as the phase difference shown in the third row of FIG. 7. Because the reference wobble is generated according to the positive wobble cycle of the wobble signal, the phase difference signal indicates the place where the negative wobble cycle appears, and a series of ADIP bits shown in the fourth row of FIG. 7 can thus be generated according to the phase difference signal with a slicer. The series of ADIP bits is then respectively compared with the three permutation patterns corresponding to the ADIP synch symbol, ADIP data 0 symbol, and ADIP data 1 symbol. Because the series of ADIP bits are "10000011" which agrees with the permutation pattern of ADIP data 0 symbol, a signal indicating the appearance of the ADIP data 0 symbol is enabled, as shown in FIG. 7.

Although the conventional method shown in FIG. 7 is simple, the wobble signal may sometimes carry noise, affecting the generation of phase difference signal. If an erroneous phase difference signal is obtained, the slicer derives erroneous ADIP bits from the erroneous phase difference signal. Because no permutation pattern can agree with the erroneous phase difference signal, no ADIP symbols are generated as the final demodulating output, causing demodulation error. Thus, a method with higher noise tolerance is required to demodulate ADIP symbols.

Optical disks with the format of DVD-R or DVD-RW are addressed according to pre-pit information. According to the DVD-R/RW specification, each error correction code (ECC) block includes 16 sectors, each of which further includes 26 frames. The 26 frames are divided into even frames and odd frames, and each frame includes eight wobble cycles. Every two frames have three pre-pit bits for storing addressing information. FIG. 8 shows the pre-pit bits associated with a wobble signal 800 of two successive frames 802 and 812, wherein the frame 802 is an even frame and the frame 812 is an odd frame. The three pre-pit bits associated with the two frames 802 and 812 may appear on the first three wobble cycles 804, 806, and 808 of the even frame 802 or the first three wobble cycles 814, 816, and 818 of the odd frame 812.

The three pre-pit bits associated every two frames may represent even synch, odd synch, data 0, and data 1 symbols. FIG. 9 shows the information contents of four types of pre-pit symbols recorded with three pre-pit bits. If the pre-pit symbol represents synchronous information appearing on an even frame, the three pre-pit bits are "111". If the pre-pit symbol represents synchronous information appearing on an odd frame, the three pre-pit bits are "110". If the pre-pit symbol represents data 1, the three pre-pit bits are "101". If the pre-pit symbol represents data 0, the three pre-pit bits are "100". When a pre-pit bit is "1", the wobble cycle associated with the pre-bit bit has a spike pulse on the peak of the wobble cycle. Otherwise, when an pre-pit bit is "0", the wobble cycle associated with the pre-bit bit has no spike pulse on the peak of the wobble cycle. Thus, the pre-pit bits can be determined by detecting the spike pulse on the corresponding wobble cycles of two successive frames, and pre-bit symbols can then be determined according to pre-pit bits.

The conventional method for determining pre-pit bits, however, can cause significant errors if noise occurs in the wobble signal carrying pre-pit bits. This can generate erroneous pre-pit bits, and further determine erroneous pre-pit symbols. Thus, a method with higher noise tolerance is required for decoding pre-pit symbols.

In addition, conventional blank area detection of an optical disk drive is realized by detecting the transient spacing of a binaries RF signal. The RF signal is first generated by the optical pickup head. Before binarizing the RF signal to the binaries RF signal, a high pass filter is utilized to remove low frequency components in the RF signal to generate a filtered RF signal. Then the filtered RF signal is binarized to form the binaries RF signal via a slicer with a reference threshold value. Since the amplitude levels of the RF signal from various disks are diverse, it is hard to determine each threshold value to slice RF signal for different disk types. Thus, a method and an apparatus to detect the blank area disregarding the amplitude levels of the RF signal are desired for optical disk drives.

BRIEF SUMMARY OF THE INVENTION

The invention provides an apparatus for demodulating an Address In Pre-groove (ADIP) symbol. The ADIP symbol is carried by a wobble signal of an optical disk and comprises a series of ADIP bits permuted according to one of a plurality of permutation patterns to make up the ADIP symbol. In one embodiment, the apparatus comprises a wobble extraction module, a reference wobble generator, a waveform difference measurement module, and a pattern matching module. The wobble extraction module extracts the wobble signal from the optical disk. The reference wobble generator generates a reference wobble with the same frequency and phase as a fundamental frequency and phase of a positive wobble cycle of the wobble signal. The waveform difference measurement module then measures a difference between the wobble signal and the reference wobble to obtain a series of difference measurement values respectively corresponding to the ADIP bits. The pattern matching module then compares probabilities of the permutation of the ADIP bits agreeing with each of the permutation patterns according to the difference measurement values to determine the ADIP symbol.

The invention also provides an apparatus for decoding a pre-pit symbol. The pre-pit symbol is carried by a wobble signal of an optical disk and comprises a series of pre-pit bits permuted according to one of a plurality of permutation patterns to make up the pre-pit symbol. In one embodiment, the apparatus comprises a pre-pit bit collection module, a hamming distance generator array, and a pattern decision module. The pre-pit bit collection module collects the pre-pit bits appearing at both an odd frame and an even frame of the wobble signal to obtain a pre-bit bit set, wherein the pre-pit bits of the pre-pit symbol only appear at either the odd or even frame. The hamming distance generator array then measures a plurality of hamming distances between the pre-pit bits of the pre-bit set and each of the permutation patterns. The pattern decision module then finds the permutation pattern having a minimum of the hamming distances to determine the pre-pit symbol.

A method for demodulating an Address In Pre-groove (ADIP) symbol is also provided, wherein the ADIP symbol is carried by a wobble signal of an optical disk and comprises a series of ADIP bits permuted according to one of a plurality of permutation patterns to make up the ADIP symbol. First, the wobble signal is extracted from the optical disk. A reference wobble with the same frequency and phase as a fundamental frequency and phase of a positive wobble cycle of the wobble signal is then generated. A difference between the wobble signal and the reference wobble is then measured to obtain a series of difference measurement values respectively corresponding to the ADIP bits. Finally, probabilities of the permutation of the ADIP bits agreeing with each of the permutation patterns are compared according to the difference measurement values to determine the ADIP symbol.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 9 shows four types of permutation patterns of three pre-pit bits making up a pre-pit symbol;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 10:
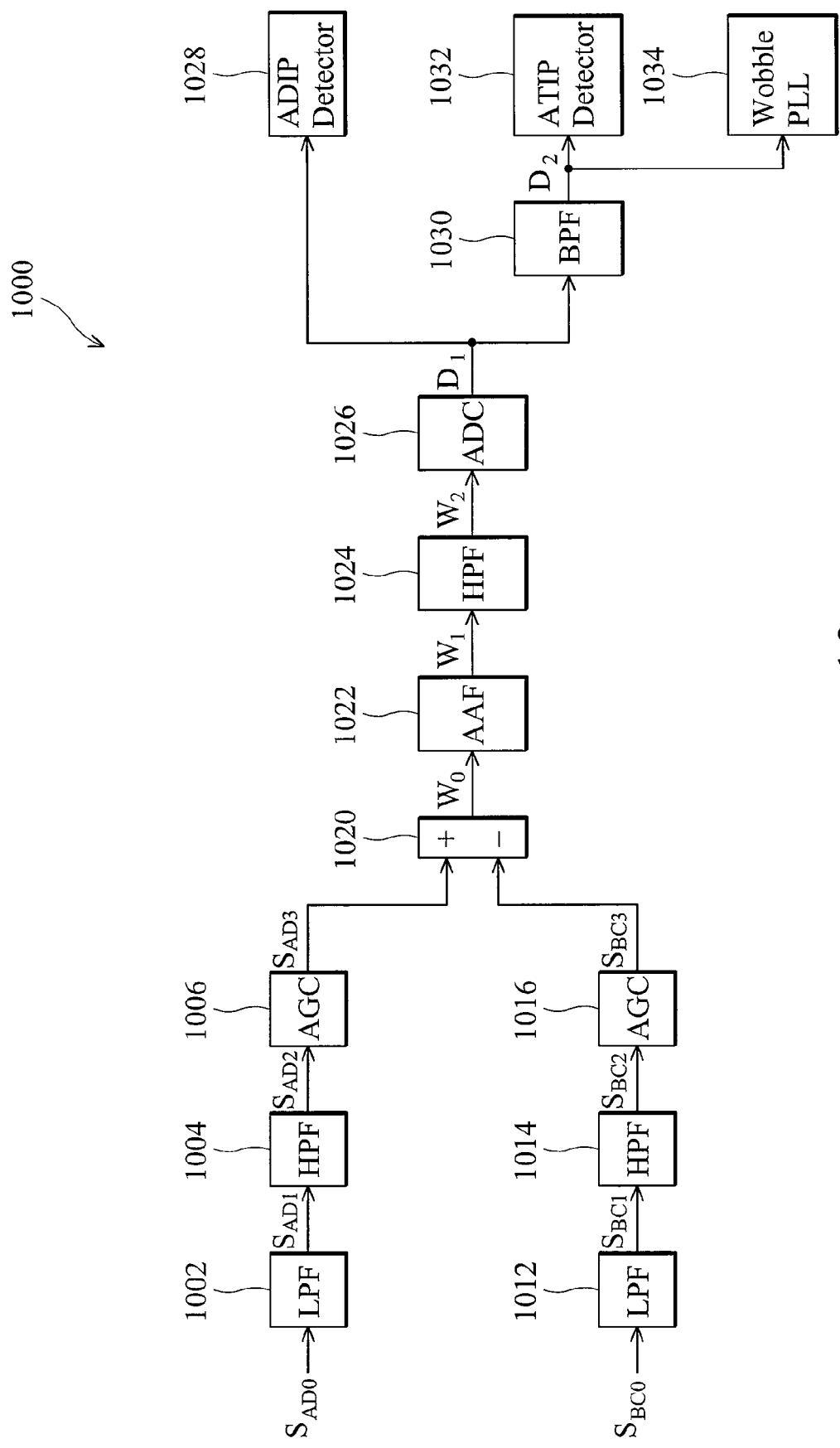
FIG. 10 is a block diagram of a wobble detection circuit according to the invention.

FIG. 10 is an exemplary block diagram of a wobble detection circuit 1000 according to the invention. A pickup head detects four reflection signals $S_A$, $S_B$, $S_C$, and $S_D$ reflected from an optical disk, wherein signals $S_A$, $S_D$ and signals $S_B$, $S_C$ are respectively representing light intensity reflected from the opposite sides of a track. The reflection signals $S_A$ and $S_D$ are then added to obtain a signal $S_{AD0}$, and the reflection signals $S_B$ and Sc are then added to obtain a signal $S_{BC0}$. Because the signals $S_{AD0}$ and $S_{BC0}$ comprise high frequency noise induced by radio frequency signals and low frequency noise induced by servo signals, low pass filters 1002 and 1012 and high pass filters 1004 and 1014 respectively eliminate the high frequency noise and the low frequency noise from the signals $S_{AD0}$ and $S_{BC0}$, and signals $S_{AD2}$ and $S_{BC2}$ are obtained.

Two automatic gain controllers (AGC) 1006 and 1016 then amplify the signals $S_{AD2}$ and $S_{BC2}$ to the same signal level to obtain signals $S_{AD3}$ and $S_{BC3}$. An adder 1020 then subtracts the signal $S_{BC3}$ from the signal $S_{AD3}$ to obtain a wobble signal $W_0$. The more balanced the signals $S_{BC3}$ and $S_{AD3}$, the less radio frequency noise remains in the wobble signal $W_0$. To minimize aliasing of the wobble signal $W_0$, an anti alias filter (AAF) 1022 then filters off aliasing components of the wobble signal $W_0$ to obtain a wobble signal $W_1$. After the wobble signal $W_1$ passes a high pass filter 1024 to obtain a wobble signal $W_2$, an analog to digital converter 1026 converts the analog wobble signal $W_2$ to a digital wobble signal $D_1$.

The ATIP information carried by the digital wobble signal D1 is modulated within a frequency range. To extract the ATIP information, a digital band pass filter 1030 accepts frequency components of the digital wobble signal $D_1$ within a pass band and rejects frequency components of the digital wobble signal D1 outside the pass band to obtain a digital wobble signal D2. An ATIP detector 1032 then extracts ATIP information from the digital wobble signal D2. A wobble phase locked loop 1034 also locks the phase of the digital wobble signal $D_2$ to generate a clock signal [not shown] with the same frequency as the digital wobble signal $D_2$. Additionally, an address in pre-groove (ADIP) detector 1028 derives ADIP information from the wobble signal $D_1$.

Because the analog to digital converter 1026 converts the analog wobble signal $W_2$ to the digital wobble signal $D_1$, the band pass filter 1030 can digitally filter the digital wobble signal $D_1$ to generate the digital filtered wobble signal $D_2$. Digital signal filtration has an advantage of signal processing simplicity over analog signal filtration. Samples of a digital signal are taken as a series of variables of a filter function, and a digital filter calculates the outputs of the filter function with the input variables of digital signal samples to obtain samples of a filtered signal. Analog filtration, however, requires analog circuits with complicated circuit design and numerous circuit components such as resistors and capacitors to complete analog filtration. Additionally, an analog filter requires high current to drive the circuit components thereof, consuming considerable energy. Thus, the wobble detection circuit 1000 with the digital band pass filter 1030 has simpler circuit design, lower hardware cost, and reduced energy consumption compared with conventional wobble detection circuits.

Figure 11:
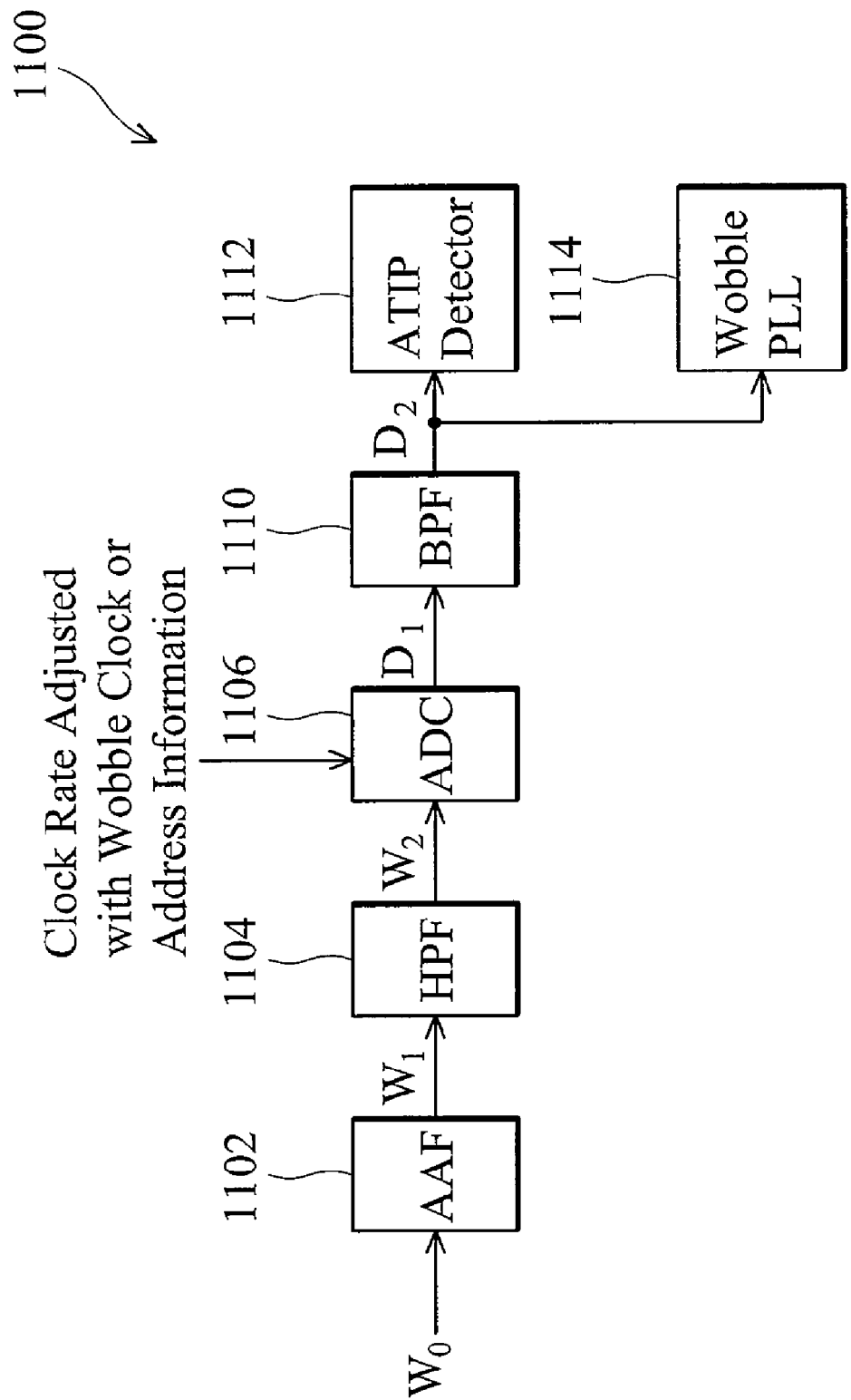
FIG. 11 is a block diagram of a portion of a wobble detection circuit with a sampling rate changed with wobble frequencies according to the invention.

FIG. 11 is an exemplary block diagram of a portion of a wobble detection circuit 1100 with a sampling rate changed with wobble frequencies according to the invention. An optical disk drive reads optical disk of multiple categories. Because center frequencies of wobble signals of different optical disk types are also different, if an analog to digital converter 1106 converts a wobble signal $W_2$ to a digital wobble signal $D_1$ with a constant sampling rate, the center frequency of band pass filter or other filter will not changed according to wobble signal carrier frequency.

Accordingly, the analog to digital converter 1106 samples the analog wobble signal $W_2$ according to trigger of a clock signal [not shown] with the wobble frequency of the analog wobble signal $W_2$. Thus, the sampling rate of the analog to digital converter 1106 changes with the wobble frequency. In one embodiment, the clock signal triggering the analog to digital converter 1106 is generated by the phase locked loop 1114. In another embodiment, because the wobble frequency of an optical disk spun with constant angular velocity can be estimated according to address information of the analog wobble signal $W_2$, the clock signal is generated according to the address information, and the sampling frequency of the analog to digital converter 1106 is changed with the address information.

Figure 12:
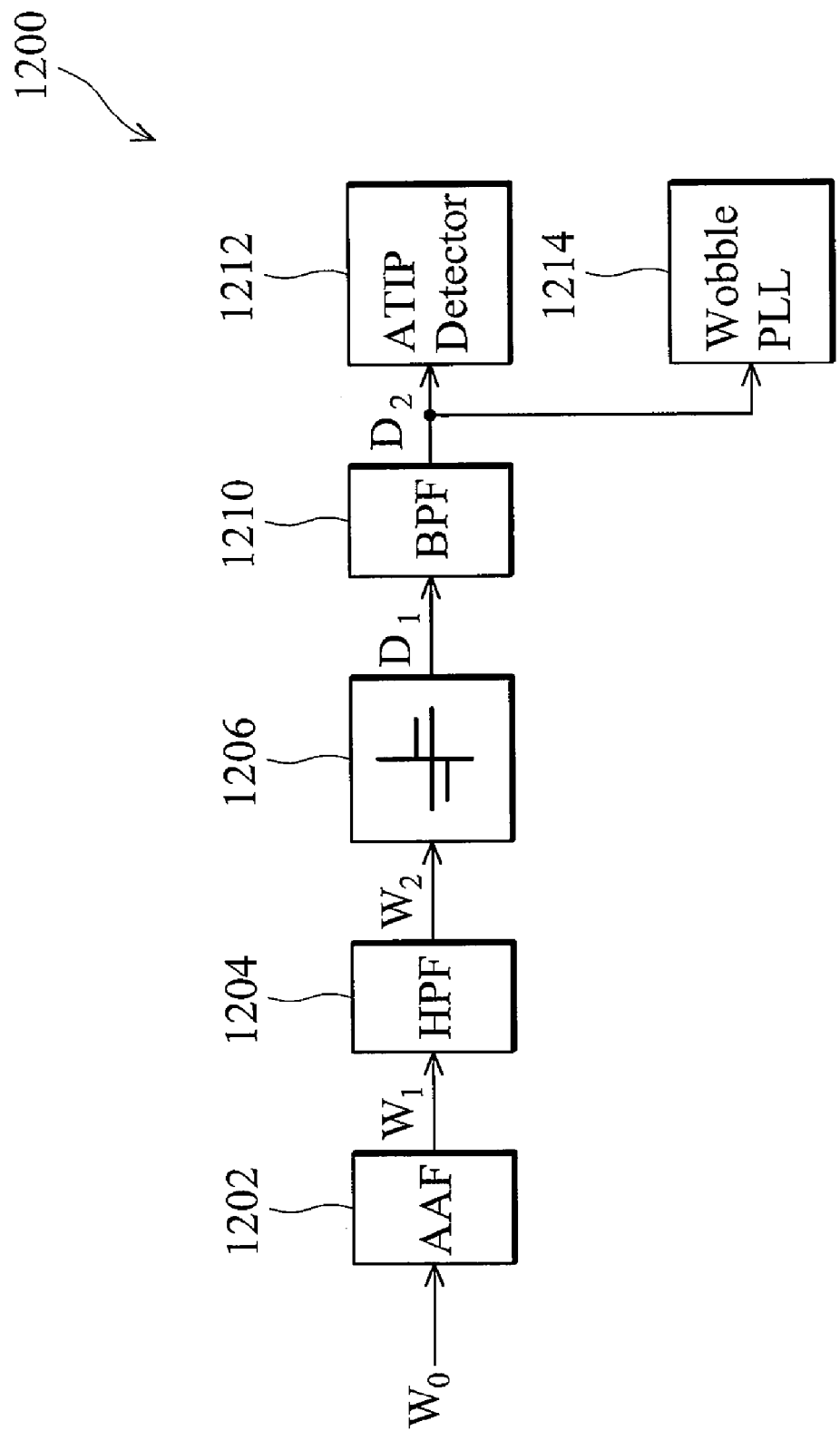
FIG. 12 is a block diagram of a portion of a wobble detection circuit with a 1-bit analog to digital converter according to the invention.

FIG. 12 is an exemplary block diagram of a portion of a wobble detection circuit 1200 with a 1-bit analog to digital converter 1206 according to the invention. To ensure that the filtered wobble signal $D_2$ is of good filtration quality, the analog to digital converter 1206 samples the analog wobble signal $W_2$ with high sampling frequency. To simplify the filtration process of the digital band pass filter 1210, signal resolution of the digital wobble signal D1 input thereto is lowered. In one embodiment, the analog to digital converter 1206 is a 1-bit analog to digital converter, a decision maker or a comparator, converting the analog wobble signal $W_2$ to a digital wobble signal $D_1$ of 1-bit data stream. When the analog to digital converter 1206 is a 1-bit analog to digital converter, the sampling frequency is about exceeding eight times the wobble carrier frequency.

The invention provides a wobble detection circuit with a digital band pass filter. Unlike analog band pass filters, the digital band pass filter does not require complicated circuit design occupying large chip area and high current to drive circuit components thereof, thus, reducing chip size of the wobble detection circuit and decreasing energy consumption thereof.

Figure 13:
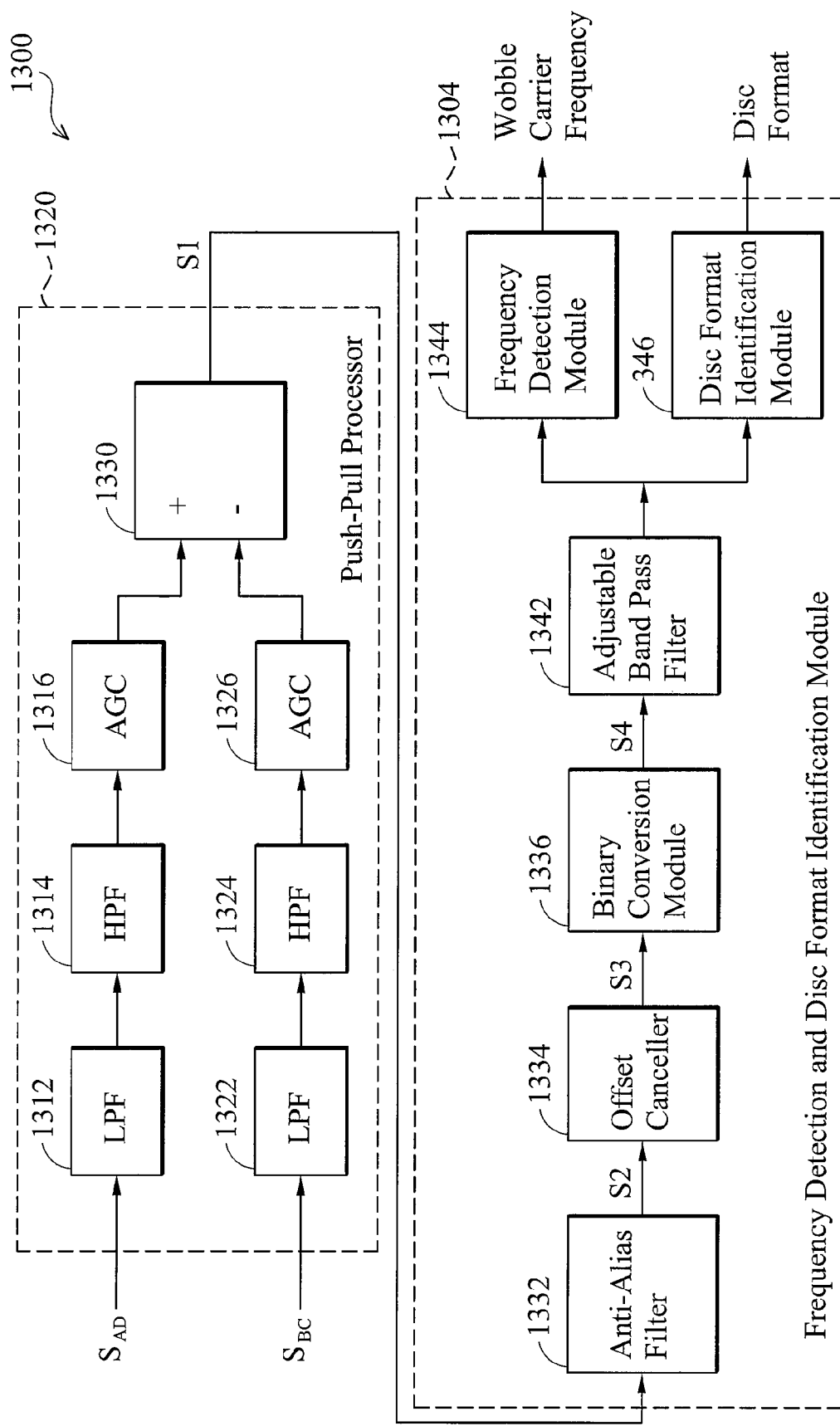
FIG. 13 is a block diagram of an apparatus for detecting the wobble carrier frequency and identifying the optical disk format according to the invention.

Please refers to FIG. 13. FIG. 13 is an exemplary block diagram of an apparatus 1300 for detecting the wobble carrier frequency and identifying the optical disk format according to the invention. Apparatus 1300 includes a push-pull processor 1302, generating the wobble signal shown in FIG. 1*d*, and a frequency detection and disk format identification module 1304, detecting the wobble carrier frequency and the disk format of the optical disk. The frequency detection and disk format identification module 1304 adopts a new architecture and method different from the conventional circuit 400 to detect the wobble carrier frequency and identify the optical disk type. In the novel architecture and method provided by the invention, remnant noise existing in the wobble signal generated by push-pull processor 1302 does not affect the detection of the wobble carrier frequency in frequency detection and disk format identification module 1304.

Figure 1A:
FIG. 1a is a wobble carrier without address information recorded thereon.
Figure 1B:
FIG. 1b shows signal $S_{AD}$ and FIG. 1c show shows signal $S_{BC}$.
Figure 1C:
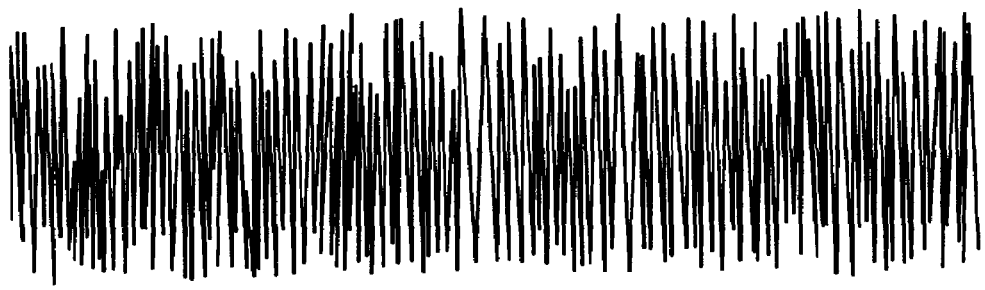
Figure 1D:
FIG. 1d shows the wobble signal obtained by subtracting the amplified wobble signal of FIG. 1c from the wobble amplified signal of FIG. 1b.
Figure 2:
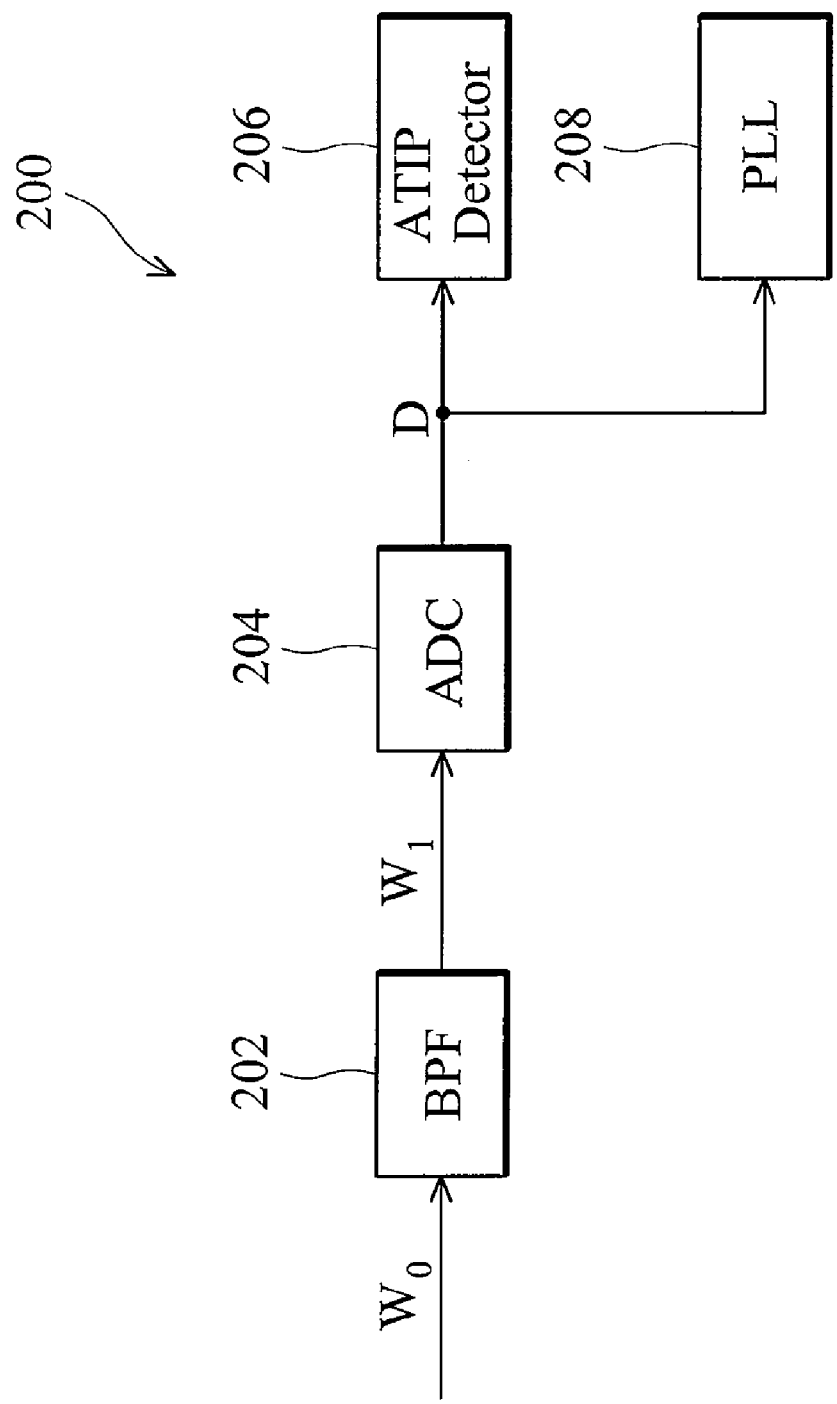
FIG. 2 is a block diagram of a conventional wobble detection circuit detecting ATIP information.

First, as mentioned above the reflected signals $S_A$, $S_B$, $S_C$, $S_D$ are simultaneously obtained by scanning a track of the optical disk. And synthesized signal $S_{AD}$ and $S_{BC}$ as shown in FIGS. 1*b* and 1*c* are obtained accordingly. The push-pull processor 1302 then processes the signals $S_{AD}$ and $S_{BC}$ to generate the wobble signal $S_1$ as shown in FIG. 13. The push-pull processor 1302 includes two low pass filters 1312 and 1322, two high pass filters 1314 and 1324, two automatic gain controllers 1316 and 1326, and a adder 1330. The low pass filters 1312 and 1322 first respectively exclude the high-frequency noise of the signals $S_{AD}$ and $S_{BC}$. The high pass filters 1314 and 1324 then respectively exclude the low-frequency noise of the signals $S_{AD}$ and $S_{BC}$. After filtration, the filtered signals $S_{AD}$ and $S_{BC}$ are further amplified to an appropriate strength level by the automatic gain controllers 1316 and 1326 for further processing, so that the amplified signals meet the same strength level. The more equivalent the strength level of the amplified signals $S_{AD}$ and $S_{BC}$, the less the remnant noise existing in the output signal of the push-pull processor 1302. The adder 1330 then subtracts the amplified signal $S_{BC}$ from the amplified signal $S_{AD}$ to obtain the signal $S_1$.

The frequency detection and disk format identification module 1304 then detects the wobble carrier frequency of the optical disk according to signal $S_1$. Because each format of optical disk has a distinctive wobble carrier frequency, the optical disk format is identified if the wobble carrier frequency is determined. The frequency detection and disk format identification module 1304 includes an anti-alias filter 1332, an offset canceller 1334, a binary conversion module 1336, an adjustable band pass filter 1342, a frequency detection module 1344, and a disk format identification module 1346. The frequency detection and disk format identification module 1304 is further described in the following with FIGS. 14~16.

Figure 14:
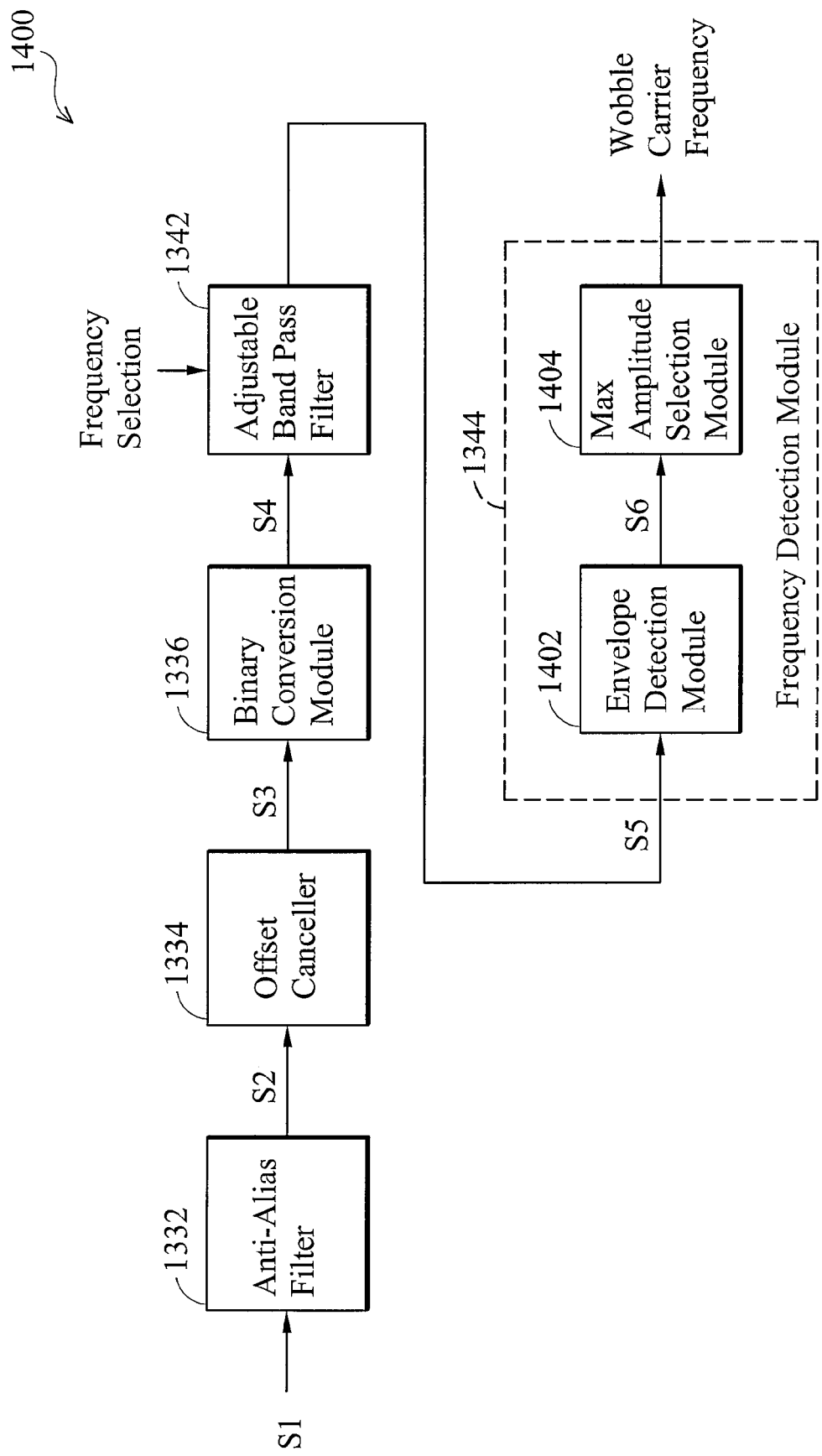
FIG. 14 is a block diagram of an apparatus for detecting the wobble carrier frequency of an optical disk according to the invention.

FIG. 14 is a block diagram of an apparatus 1400 for detecting the wobble carrier frequency of an optical disk according to the invention. The apparatus 1400 is a sub-module of the frequency detection and disk format identification module 1304 and includes the anti-alias filter 1332, the offset canceller 1334, the binary conversion module 1336, the adjustable band pass filter 1342, and the frequency detection module 1344. The anti-alias filter 1332 restricts the bandwidth of the signal $S_1$ to obtain a signal $S_2$ approximately satisfying the Shannon-Nyquist sampling theorem. In one embodiment, the anti-alias filter 1332 is a low pass filter. Before the filtered signal $S_2$ being converted from analog-to-digital via binary conversion module 1336, the direct current offset of the signal $S_2$ is cancelled in advance by the offset canceller 1334 to obtain a signal $S_3$. In one embodiment, the offset canceller 1334 is a high pass filter. The binary conversion module 1336 then converts the analog wobble signal $S_3$ to a binary data stream $S_4$. In one embodiment, the binary conversion module 1336 is a comparator.

Figure 15A:
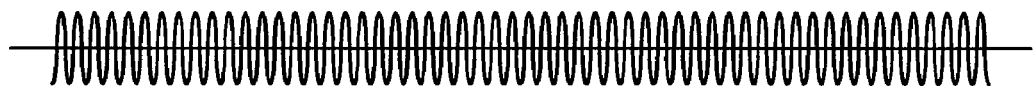
FIG. 15a shows a wobble signal before the filtration of an adjustable band pass filter.
Figure 15B:
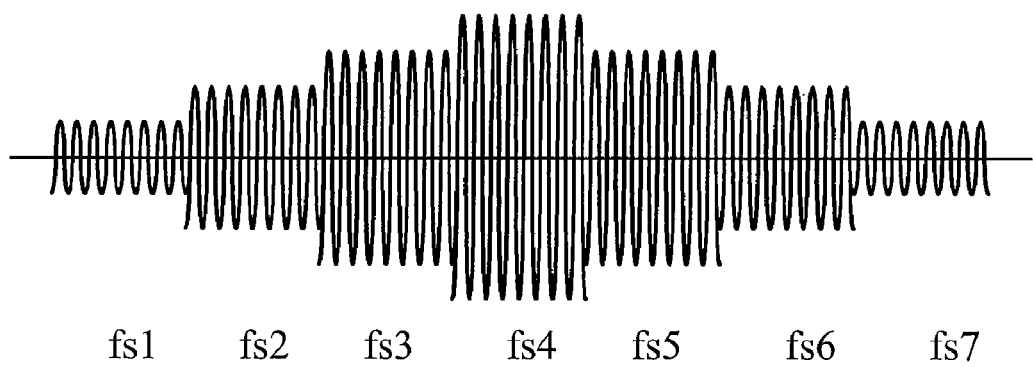
FIG. 15b shows the signal after the filtration of the adjustable band pass filter.

The adjustable band pass filter 1342 then filters the binary data stream $S_4$ according to an adjustable frequency range, the center frequency of which is sequentially adjusted according to a frequency selection signal. FIG. 15*a* shows the wobble signal $S_3$ before the filtration of the adjustable band pass filter 1342. The frequency selection signal may direct the adjustable band pass filter 1342 to sequentially filter the binary data stream $S_4$ with multiple predetermined frequency ranges, the union of which overlaps a potential range of the wobble carrier frequency. For example, seven predetermined frequency ranges are applied to filter the data stream $S_4$, and the center frequency of the predetermined frequency ranges are fs1~fs7. Only the adjustable frequency range of the binary data stream is passed by the adjustable band pass filter 1342 to generate a filtered signal $S_5$. An example of the signal $S_5$ after filtration is shown in FIG. 15*b*. Because the seven predetermined frequency ranges are sequentially applied to the adjustable band pass filter 1342, the waveform of the signal $S_5$ has seven different sections, each of which corresponds to one of the predetermined frequency ranges.

Figure 15C:
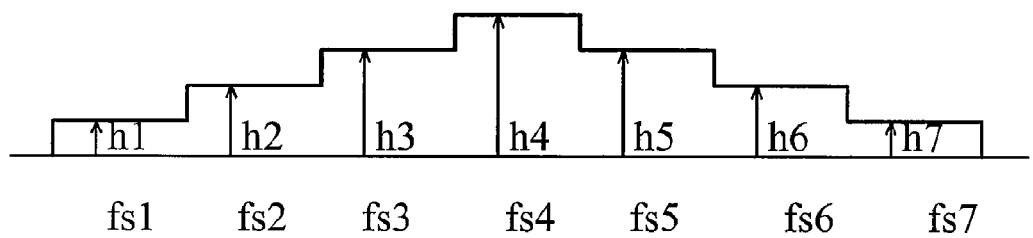
FIG. 15c shows the envelope of the signal of FIG. 15b.

The frequency detection module 1344 then determines the wobble carrier frequency of the optical disk according to the signal $S_5$. The frequency detection module 1344 includes an envelope detection module 1402 and a max amplitude selection module 1404. The envelope detection module 1402 detects the envelope of the signal $S_5$ to obtain an envelope signal $S_6$, which is shown in FIG. 15*c*. The envelope signal $S_6$ of FIG. 15*c* has seven amplitudes h1~h7 corresponding to the seven predetermined frequency ranges. Because the envelope signal $S_6$ is the envelope of the filtered signal $S_5$, the amplitude of the envelope signal $S_6$ reflects the amount of the signal $S_3$ surviving the filtration of the adjustable band pass filter 1342. The larger the amplitude, the more intense the signal $S_5$ after filtration, the more the signal $S_3$ passing the adjustable frequency range, and the closer the center frequencies of the major frequency band of signal $S_3$ and the adjustable frequency range. Thus, the wobble carrier frequency is the center frequency of the adjustable frequency range according to which the filtered signal $S_6$ section with the maximum amplitude is generated. Referring to FIG. 15*b*, the center frequency of the filtered signal $S_6$ section with the maximum amplitude is fs4, and fs4 is therefore the wobble carrier frequency of the optical disk. The wobble carrier frequency fs4 is determined by the max amplitude selection module 1404, which monitors the envelope signal $S_6$ to determine the maximum amplitude h4, and determines the center frequency fs4 of the adjustable frequency range corresponding to the maximum amplitude h4. Thus, fs4 is detected as the wobble carrier frequency.

Figure 3:
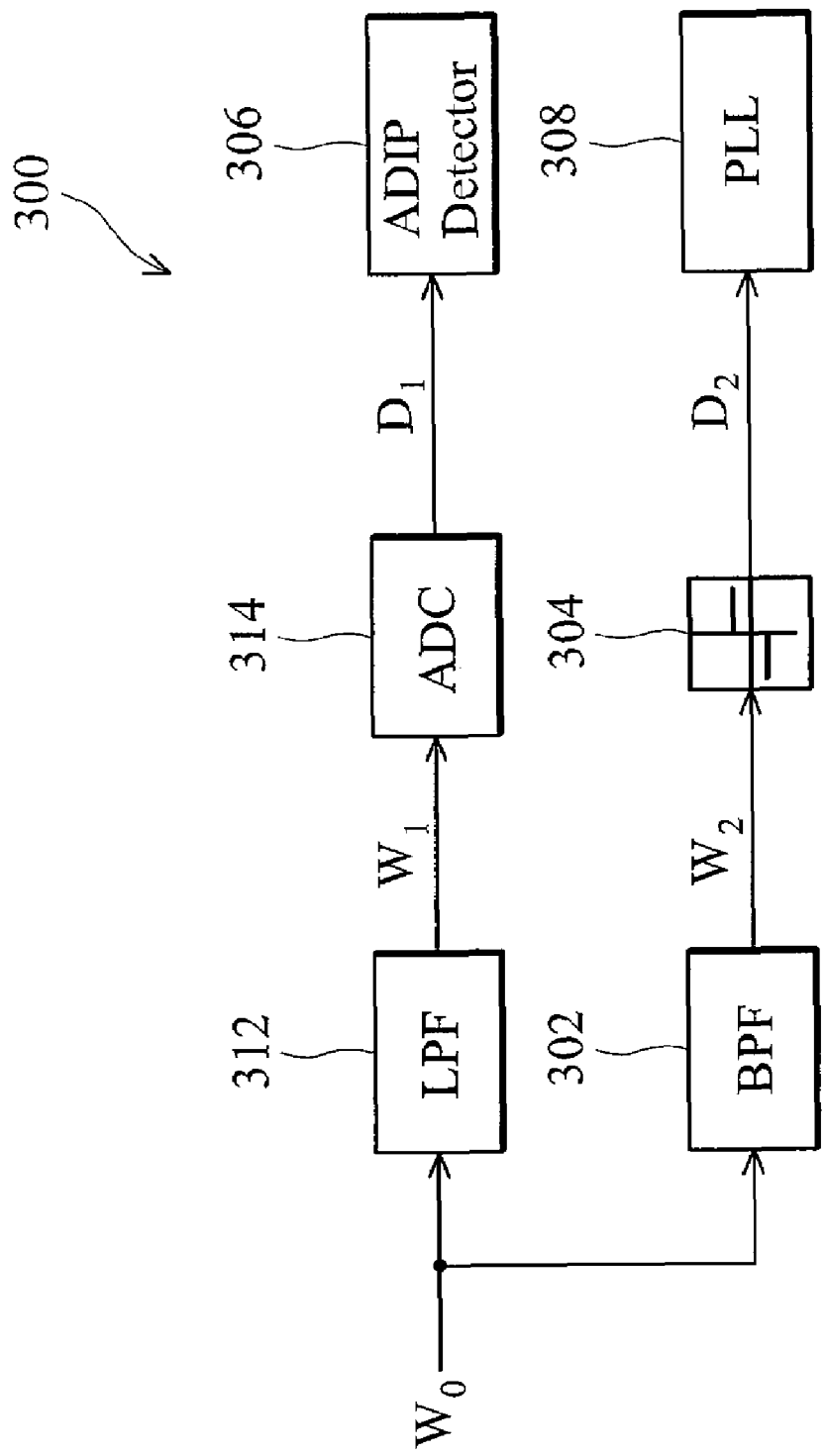
FIG. 3 is a block diagram of a conventional wobble detection circuit detecting ADIP information.
Figure 4:
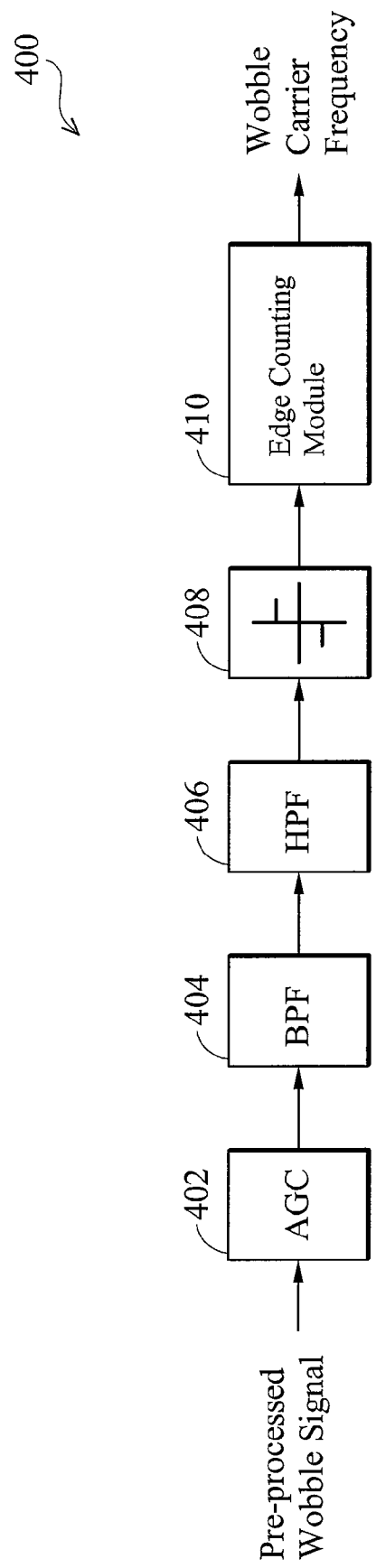
FIG. 4 is a block diagram of a conventional circuit for detecting the wobble carrier frequency.
Figure 16:
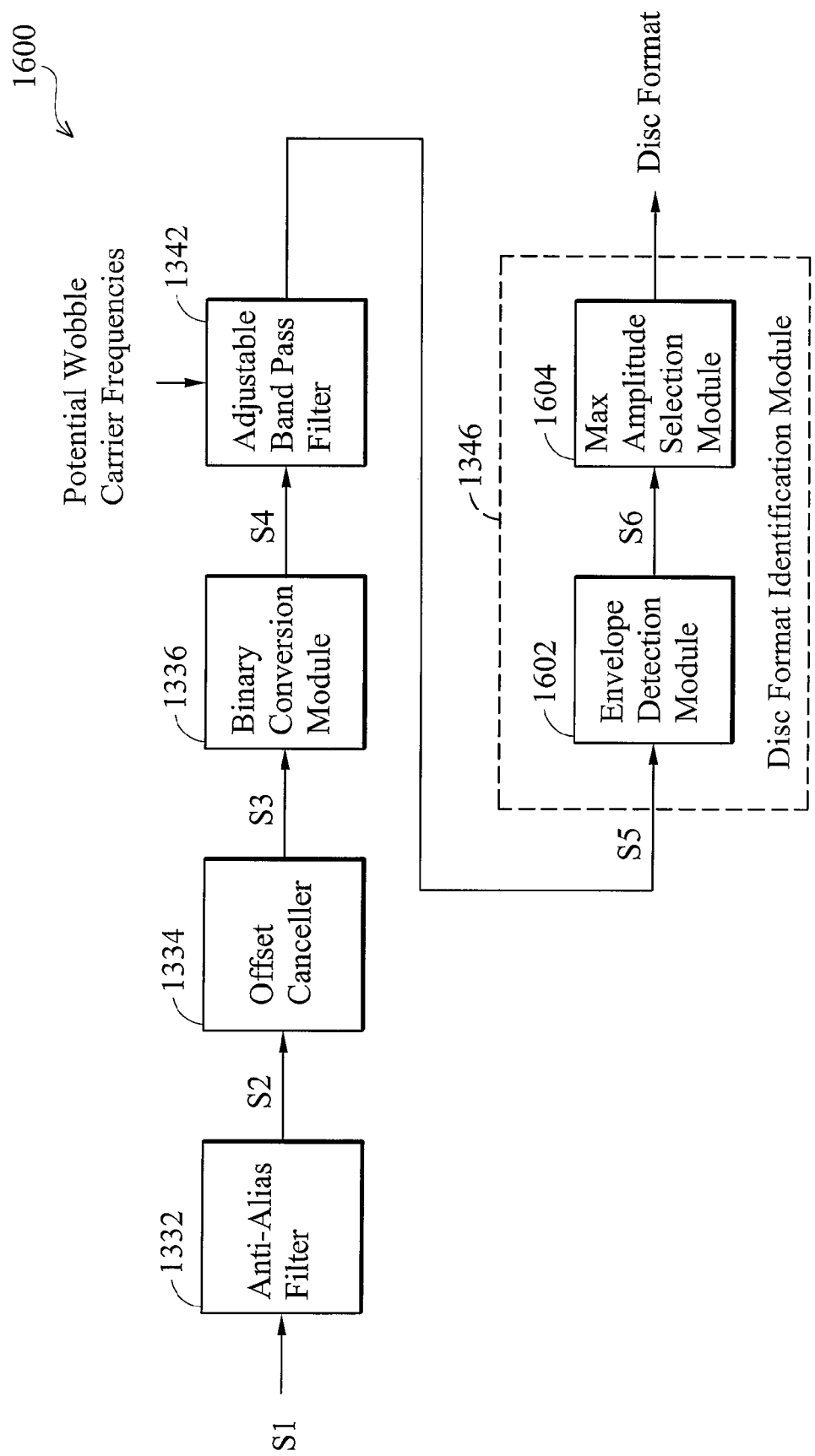
FIG. 16 is a block diagram of an apparatus for identifying the optical disk format according to the invention.

FIG. 16 is a block diagram of an apparatus 1600 for identifying the disk format of an optical disk according to the invention. The apparatus 1600 is a sub-module of the frequency detection and disk format identification module 1304 of FIG. 3. The principle according to which the apparatus 1600 functions is similar to that of the apparatus 1400. Because each format of optical disk has a distinctive wobble carrier frequency, the optical disk format is identified if the wobble carrier frequency is determined. Thus, the apparatuses 1600 and 1400 share most modules thereof. The apparatus 1600 includes the anti-alias filter 1332, the offset canceller 1334, the binary conversion module 1336, the adjustable band pass filter 1342, and a disk format identification module 1346. The disk format identification module 1346 includes an envelope detection module 1602 and a max amplitude selection module 1604. Except the selection signal of the adjustable band pass filter 1342, the modules of the apparatus 1600 are similar to those of the apparatus 1400.

Because there is only a finite number of optical disk formats, such as DVD+R, DVD-R, DVD-RAM, DVD-RW, and DVD+RW, the potential wobble carrier frequencies corresponding to the potential disk types are sequentially assigned as the center frequency of the adjustable frequency range of the adjustable band pass filter 1342 of FIG. 16. The adjustable band pass filter 1342 then filters the data stream $S_4$ generated by the binary conversion module 1336 according to the adjustable frequency range to generate a filtered signal $S_5$. The disk format identification module 1346 then determines the maximum amplitude of the filtered signal $S_5$, and determines the potential disk format corresponding to the potential wobble carrier frequency according to which the filtered signal with the maximum amplitude is generated. This is achieved by first detecting the envelope of the filtered signal with the envelope detection module 1602 to obtain an envelope signal $S_6$, and then monitoring the envelope signal $S_6$ with the max amplitude selection module 1604 to obtain the maximum amplitude. The max amplitude selection module 1604 then outputs the potential disk format corresponding to the maximum amplitude as the disk format of the optical disk. Thus, the optical disk format is identified.

Figure 17:
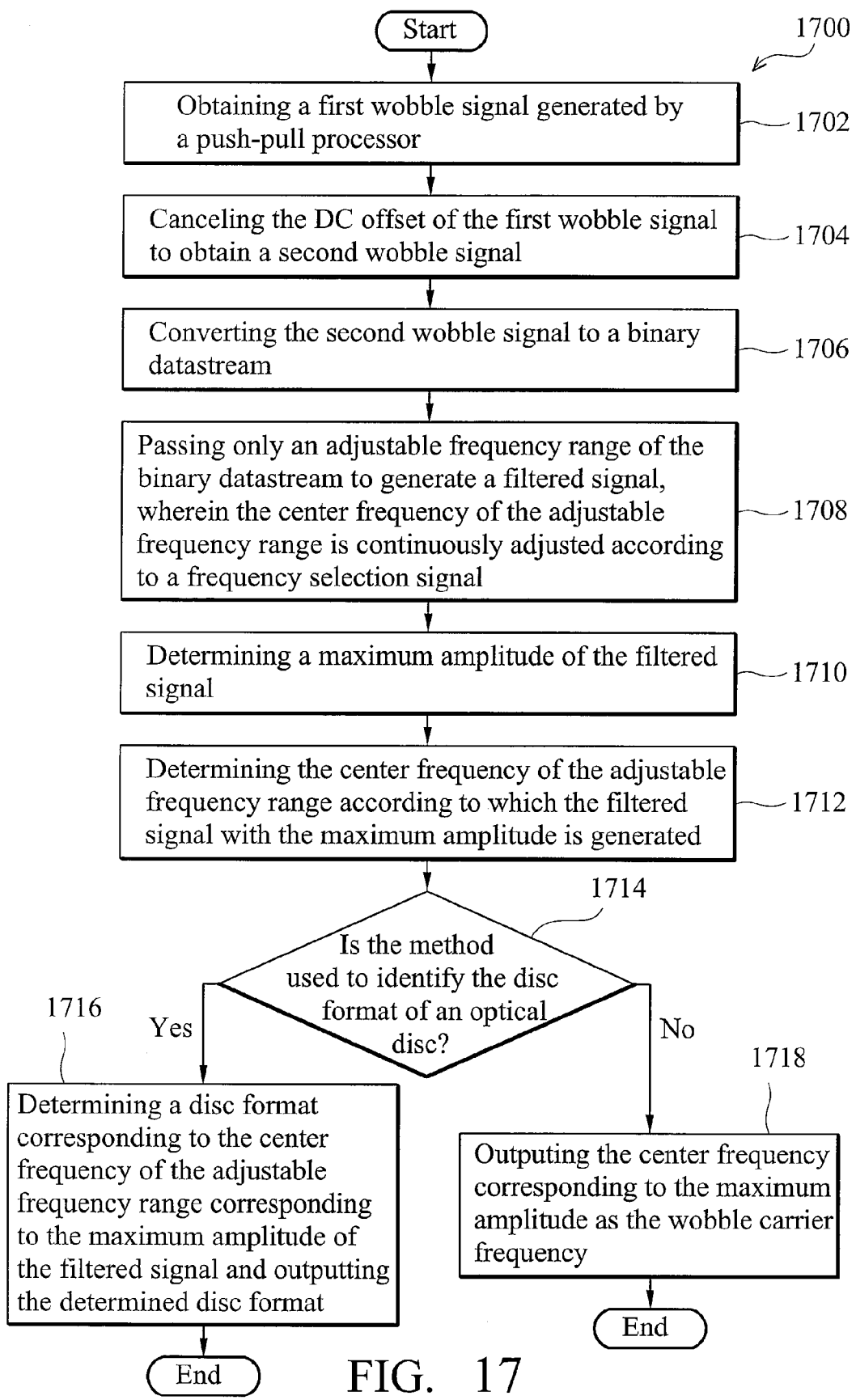
FIG. 17 is a flowchart of a method for detecting the wobble carrier frequency of an optical disk according to the invention.

FIG. 17 is a flowchart of a method 1700 for detecting the wobble carrier frequency of an optical disk according to the invention. A push-pull processor generates a first wobble signal of the optical disk in step 1702. The direct current offset of the first wobble signal is then canceled in step 1704 to obtain a second wobble signal $S_3$. The second wobble signal $S_3$ is then converted to a binary data stream $S_4$ in step 1706. The binary data stream $S_4$ is then filtered according to an adjustable frequency range in step 1708 to generate a filtered signal $S_5$, wherein the center frequency of the adjustable frequency range is sequentially adjusted according to a frequency selection signal. A maximum amplitude of the filtered signal $S_5$ is then determined in step 1710, and the center frequency of the adjustable frequency range according to which the filtered signal $S_5$ with the maximum amplitude is generated is determined in step 1712. If no disk format is required to identify in step 1714, the center frequency corresponding to the maximum amplitude is then output as the wobble carrier frequency in step 1718. Otherwise, a disk format corresponding to the maximum amplitude of the filtered signal $S_5$ is determined and the disk format is output in step 1716. Thus, both the wobble carrier frequency and the disk format of the optical disk are obtained.

The invention provides an apparatus for detecting the wobble carrier frequency and identifying the disk format of an optical disk. The noise existing in the wobble signal does not deteriorate the precision of the wobble carrier frequency. Thus, the performance of the wobble carrier frequency detection circuit provided by the invention is superior to the conventional circuit. In addition, because the adjusted band pass filter is a digital filter with simpler design and smaller chip area than the analog band pass filter in the conventional method, the manufacturing cost of the wobble carrier frequency detection circuit provided the invention is less than the conventional circuit.

Figure 18:
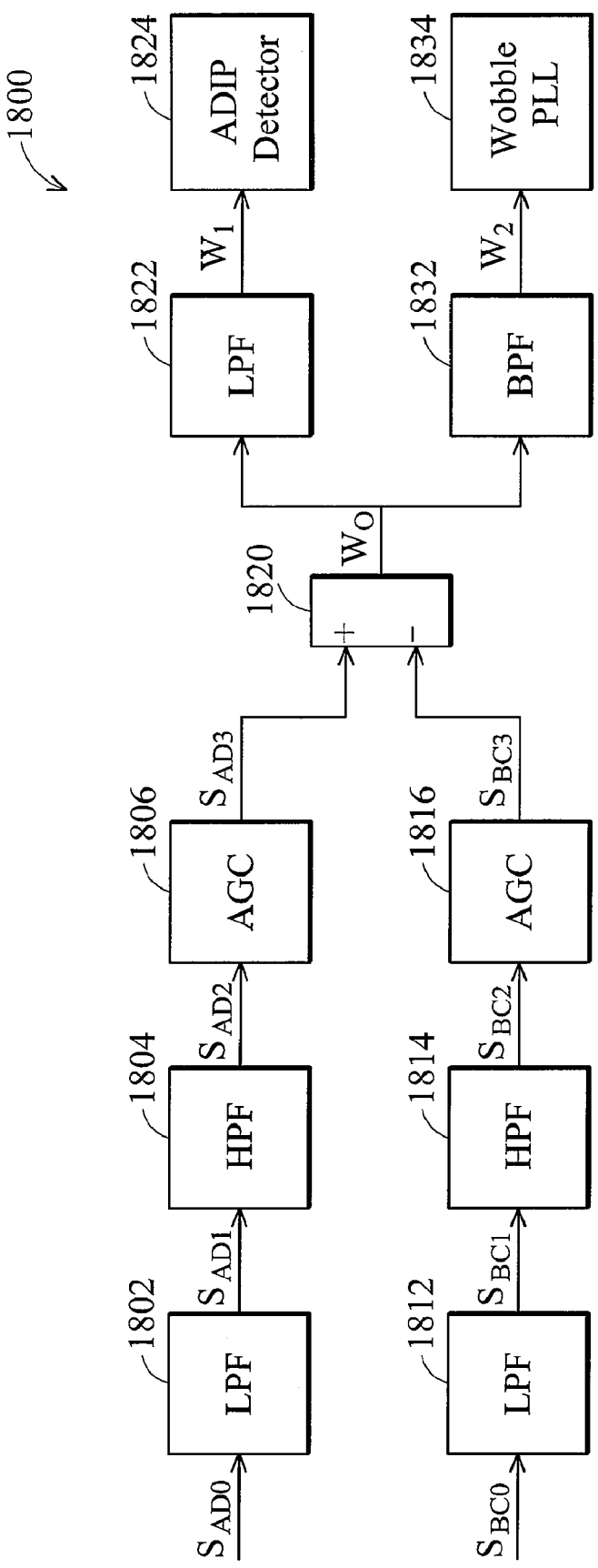
FIG. 18 is a block diagram of a wobble detection circuit according to the invention.

FIG. 18 is an exemplary block diagram of a wobble detection circuit 1800 according to the invention. Because the signals $S_{AD0}$ and $S_{BC0}$ comprise high frequency noise induced by radio frequency signals and low frequency noise induced by servo signals, the low pass filters 1802 and 1812 and the high pass filters 1804 and 1814 respectively eliminate the high frequency noise and the low frequency noise from the signals $S_{AD0}$ and $S_{BC0}$, and signals $S_{AD2}$ and $S_{BC2}$ are obtained.

Two automatic gain controllers 1806 and 1816 then amplify the signals $S_{AD2}$ and $S_{BC2}$ to the same signal level to obtain signals $S_{AD3}$ and $S_{BC3}$. The automatic gain controllers 1806 and 1816 are implemented with digital automatic gain controllers provided by the invention to simplify circuit complexity. An adder module 1820 then subtracts the signal $S_{BC3}$ from the signal $S_{AD3}$ to obtain a wobble signal $W_0$. The more balanced the signals $S_{BC3}$ and $S_{AD3}$ is, the less radio frequency noise remains in the wobble signal $W_0$. After the wobble signal $W_0$ passes a low pass filter 1822 to obtain a wobble signal $W_1$, an address in pre-groove (ADIP) detector 1824 derives ADIP information from the wobble signal $W_1$. Additionally, after the wobble signal $W_0$ passes a band pass filter 1832 to obtain a wobble signal $W_2$, a wobble phase locked loop 1834 locks the phase of the wobble signal $W_2$ to generate a clock signal [ ] not shown.

Figure 19:
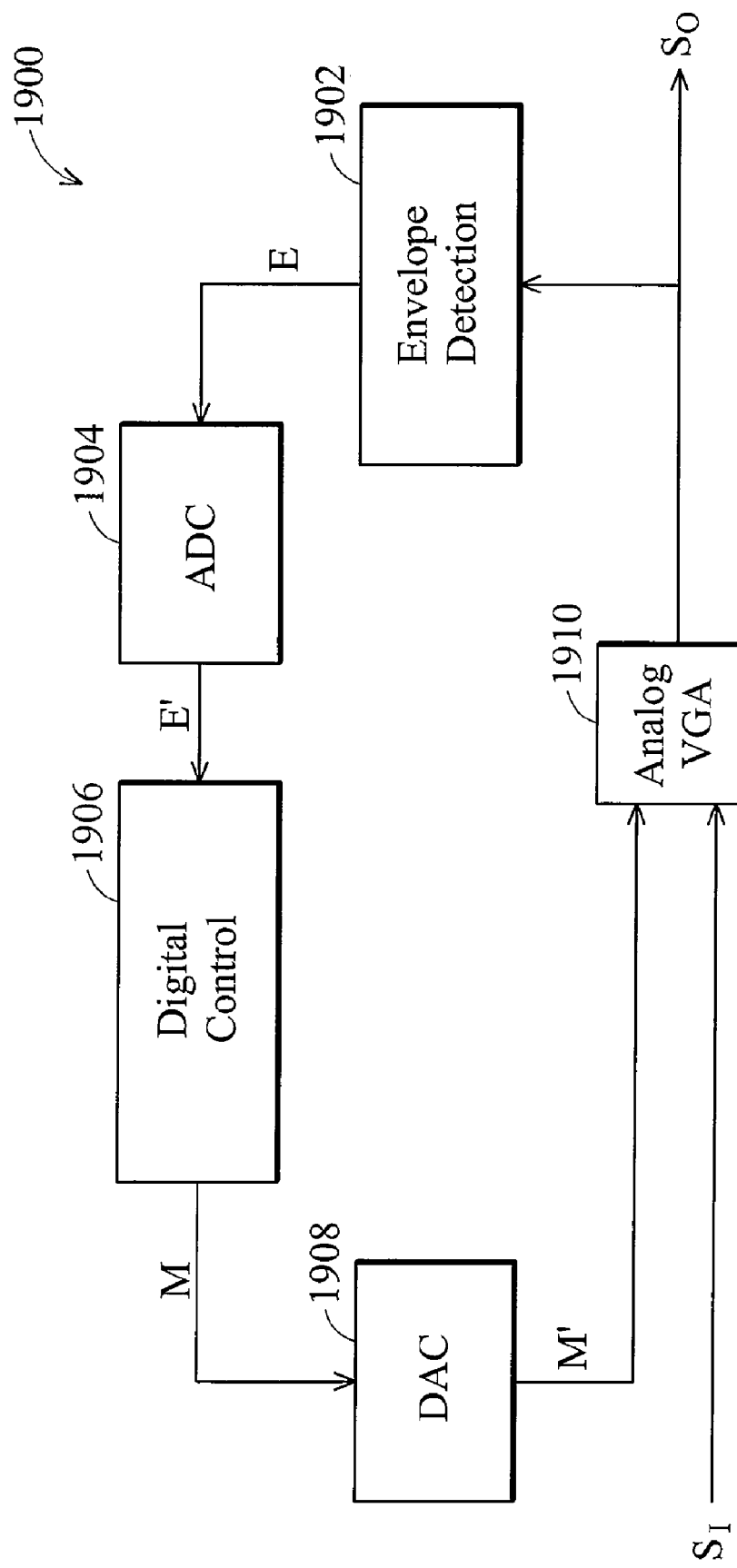
FIG. 19 is a block diagram of a digital automatic gain controller according to the invention.

FIG. 19 is a block diagram of a digital automatic gain controller 1900 according to the invention. The digital automatic gain controller 1900 includes an envelope detection module 1902, an analog to digital converter 1904, a digital control module 1906, a digital to analog converter 1908, and a variable gain amplifier 1910. The variable gain amplifier 1910 amplifies an input signal $S_I$ according to an analog gain signal M' to obtain an amplified signal $S_O$. The input signal $S_I$ can be the signal $S_{AD2}$ or the signal $S_{BC2}$ of FIG. 18, and the amplified signal $S_O$ can correspondingly be the signal $S_{AD3}$ or the signal $S_{BC3}$ of FIG. 18. The envelope detection module 1902 then detects an envelope magnitude E of the amplified signal $S_O$. The analog to digital converter 1904 then converts the envelope magnitude signal E from analog to digital to obtain a digital envelope signal E'. Because the high frequency noise of envelope signal E does not as large as the amplified signal $S_O$, and the analog to digital converter 1904 need not sample the envelope magnitude signal E with as high sampling frequency as the analog to digital converter 504 of FIG. 5.

The digital control module 1906 then determines a digital gain signal M for amplification of the input signal $S_I$ according to the digital envelope signal E'. After the digital to analog converter 1908 converts the digital gain signal M to analog gain signal M', the variable gain amplifier 1910 can amplify the input signal $S_I$ according to the analog gain signal M' to obtain the amplified signal $S_O$. The low sampling rate of the analog to digital converter 1904 decreases the sampling rate of the digital envelope signal E' and the digital gain signal M, further simplifying the circuit complexity and signal processing of the analog to digital converter 1904, the digital control module 1906, and the digital to analog converter 1908. Thus, compared to the digital automatic gain controller 500 of FIG. 5, the digital automatic gain amplifier 1900 requires less hardware cost.

Figure 20:
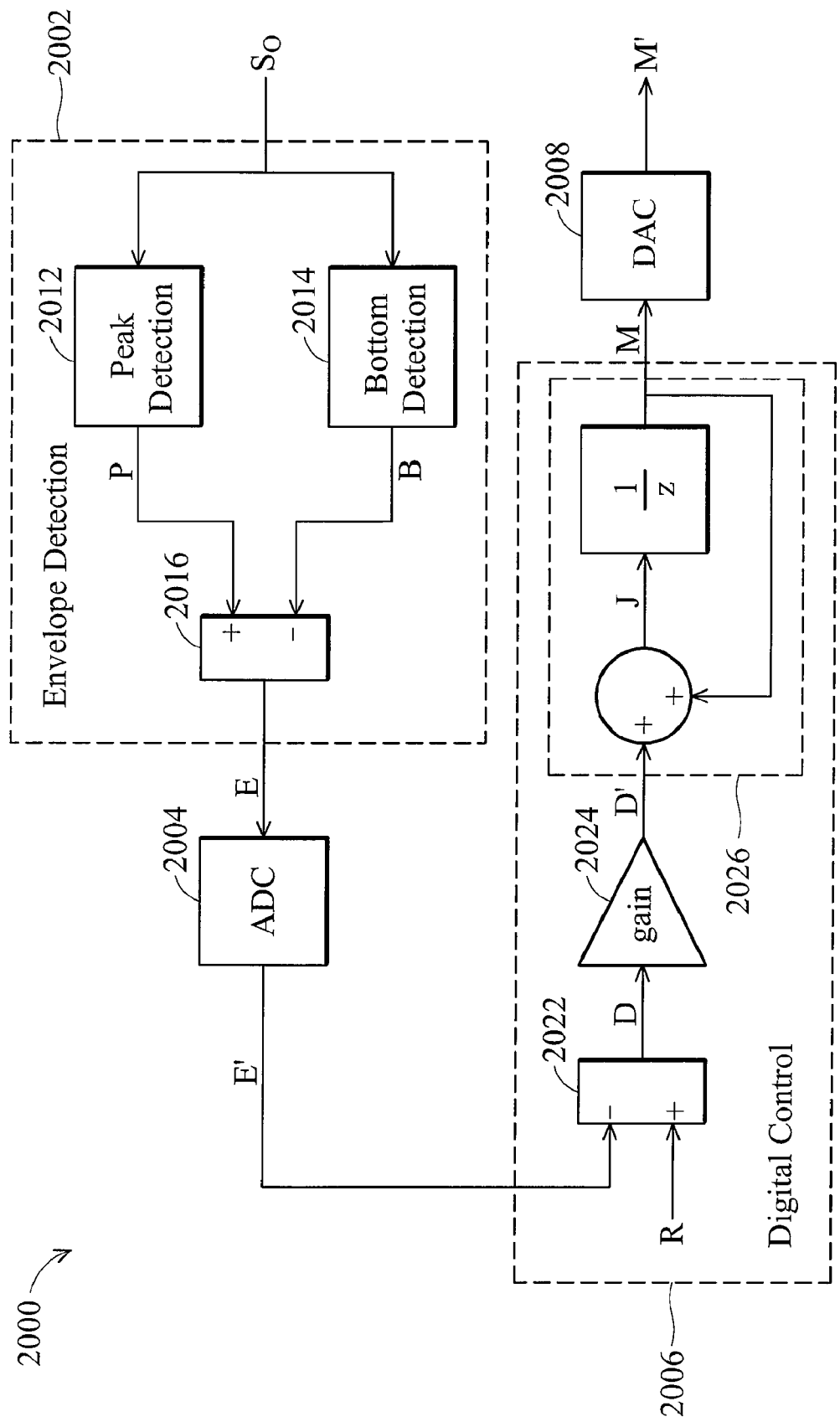
FIG. 20 is a detailed block diagram of a digital automatic gain controller with low sampling rate according to the invention.
Figure 21A:
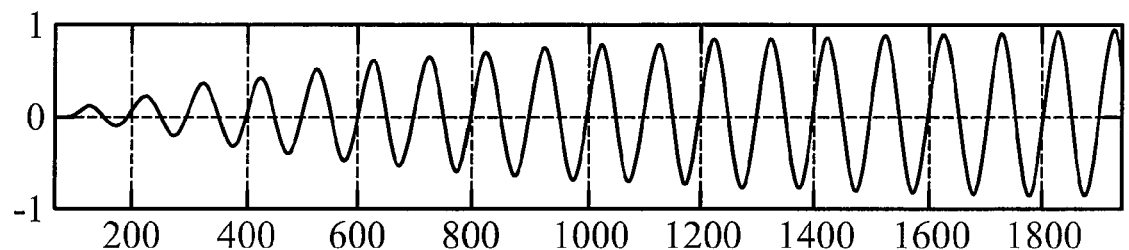
FIG. 21a shows an amplified signal.
Figure 21B:
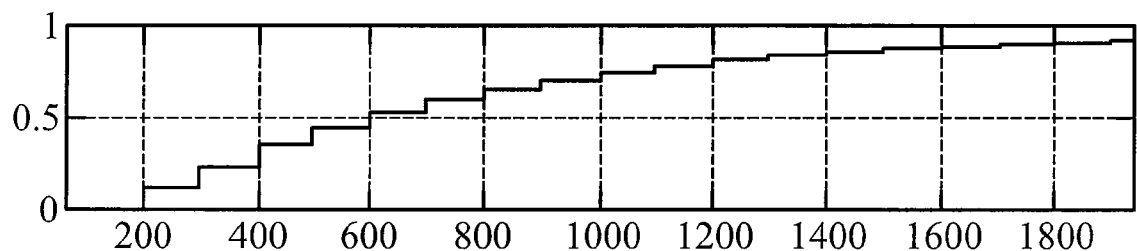
FIG. 21b shows a digital envelope signal derived from the amplified signal of FIG. 21a by an envelope detection module and a ADC of FIG. 20.

FIG. 20 is a block diagram of a digital automatic gain controller 2000 with low sampling rate according to the invention. The envelope detection module 2002 includes a peak detection module 2012, a bottom detection module 2014, and an adder 2016. The peak detection module 2012 detects a peak magnitude P of the amplified signal $S_O$. The bottom detection module 2014 detects a bottom magnitude B of the amplified signal $S_O$. The adder 2016 then subtracts the bottom magnitude B from the peak magnitude P to obtain an envelope magnitude E. An analog to digital converter 2004 then converts the envelope magnitude E to a digital envelope signal E'. FIG. 21*a* shows an amplified signal $S_O$, and FIG. 21*b* shows a digital envelope signal E' derived from the amplified signal $S_O$ of FIG. 21*a* by the envelope detection module 2002 and the ADC 2004.

Figure 21C:
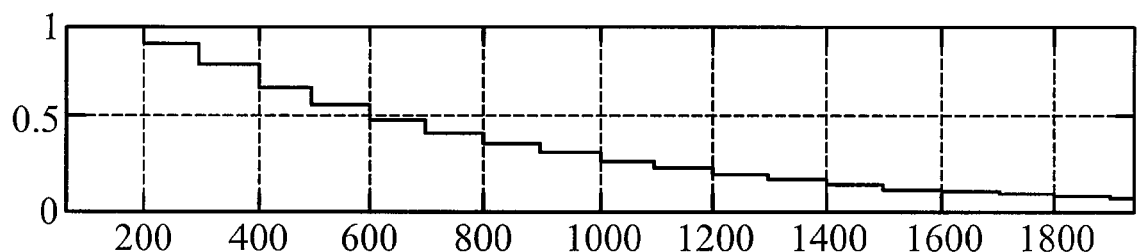
FIG. 21c shows a difference signal corresponding to the digital envelope signal of FIG. 21b.
Figure 21D:
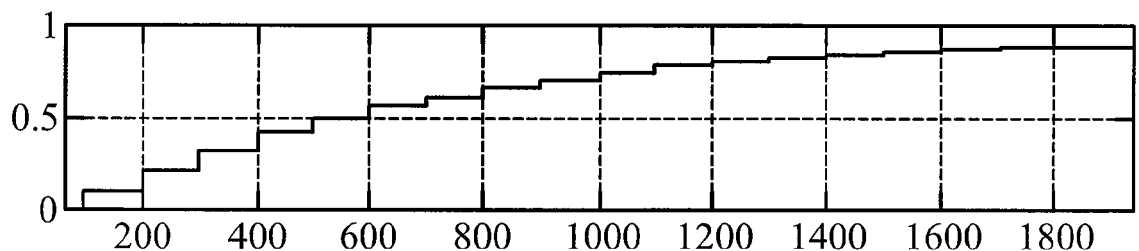
FIG. 21d shows a digital gain signal derived from the difference signal of FIG. 21c by a digital control module of FIG. 20.

The digital envelope signal E' is then delivered to a digital control module 2006. The digital control module 2006 includes an adder 2022, a gain controller 2024, and an integrator 2026. The adder 2022 subtracts the digital envelope signal E' from a reference level R to obtain a difference signal D. The gain controller 2024 then reduces the magnitude of the difference signal D to a lower level to obtain a difference signal D'. The integrator 2026 then integrates the difference signal D' to obtain the digital gain signal M. FIG. 21*c* shows a difference signal D corresponding to the digital envelope signal E' of FIG. 21*b* when the reference level is 1. FIG. 21*d* shows a digital gain signal M derived from the difference signal D of FIG. 21*c* by the digital control module 2006. Finally, a digital to analog converter 2008 converts the digital gain signal M to an analog gain signal M' for the amplification of an input signal $S_I$. Thus, a variable gain amplifier 1910 can then amplify the input signal $S_I$ according to the analog gain signal M' to obtain the amplified signal $S_O$.

Figure 22:
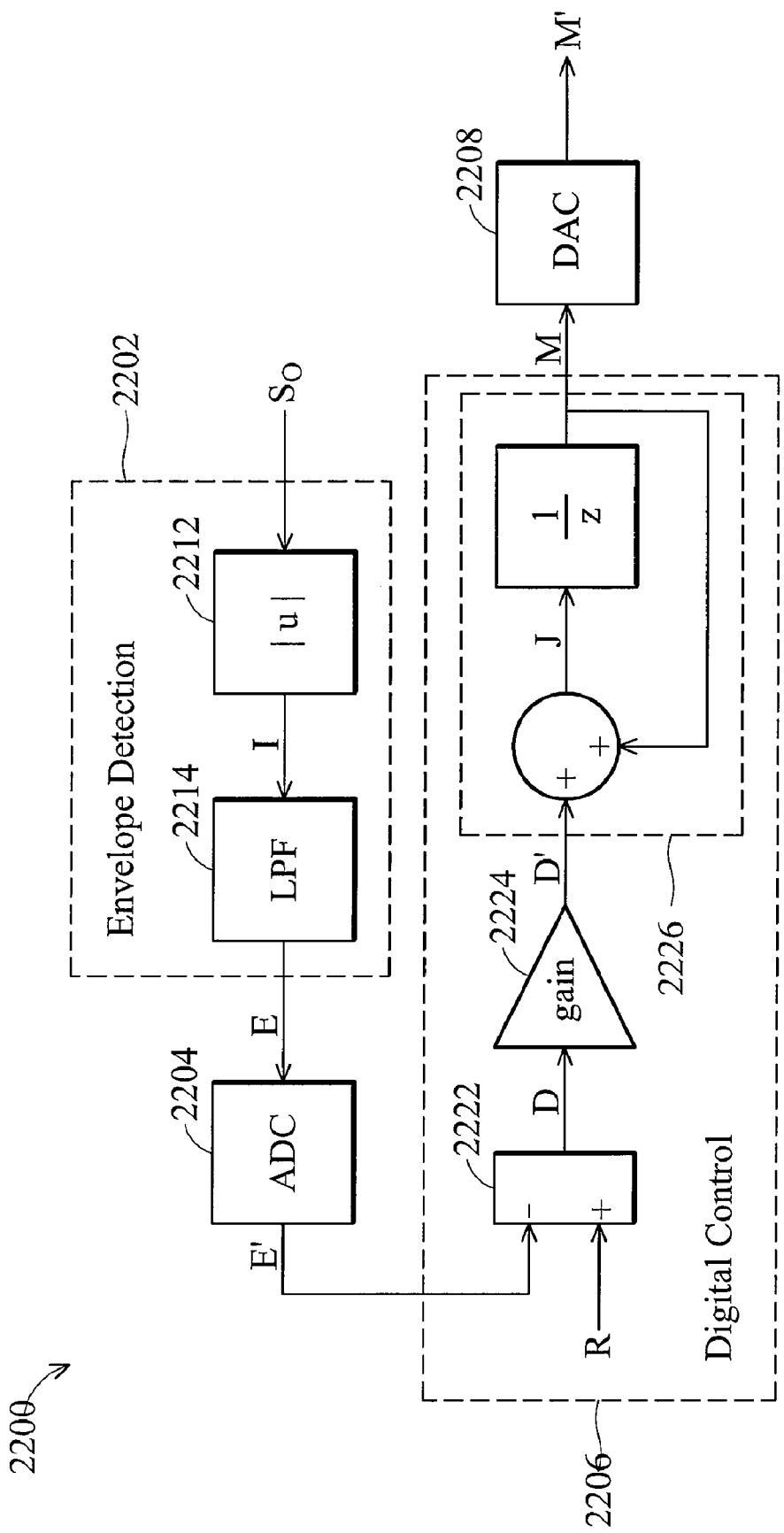
FIG. 22 is another detailed block diagram of a digital automatic gain controller with low sampling rate according to the invention.
Figure 23A:
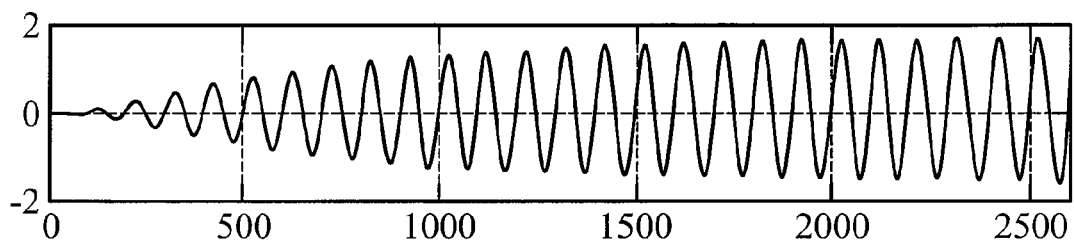
FIG. 23a shows an amplified signal.
Figure 23B:
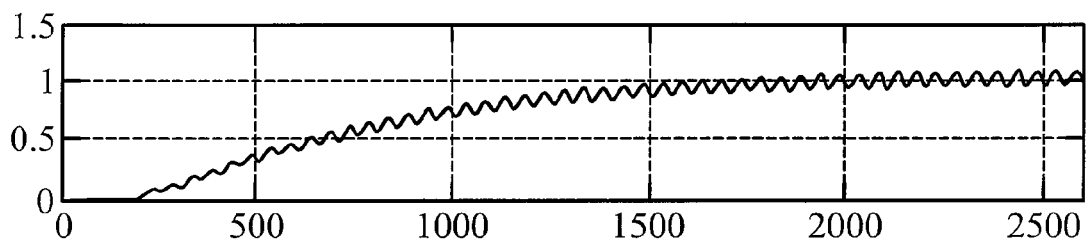
FIG. 23b shows an envelope magnitude derived from the amplified signal of FIG. 23a by an envelope detection module of FIG. 22.
Figure 23C:
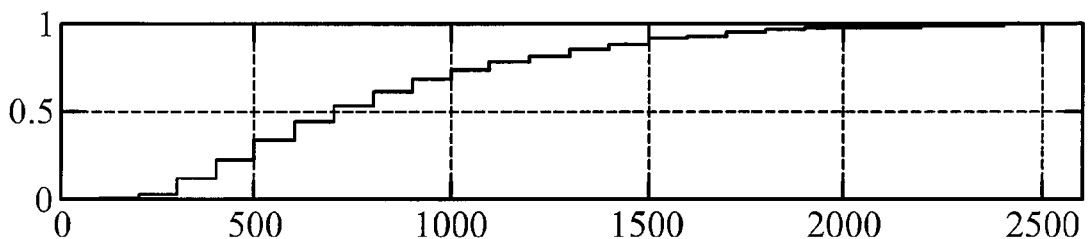
FIG. 23c shows a digital envelope signal corresponding to the envelope magnitude of FIG. 23b.
Figure 23D:
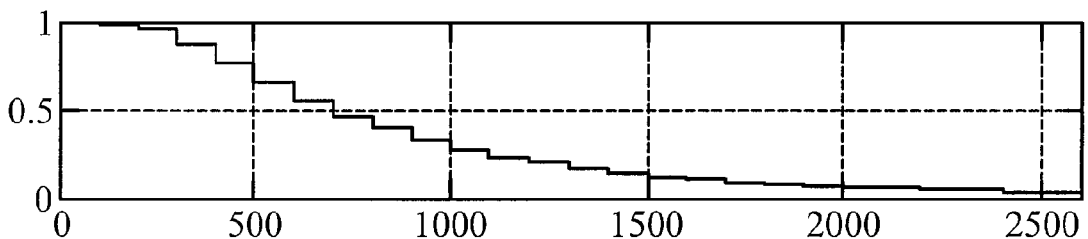
FIG. 23d shows a difference signal corresponding to the digital envelope signal of FIG. 23c.
Figure 23E:
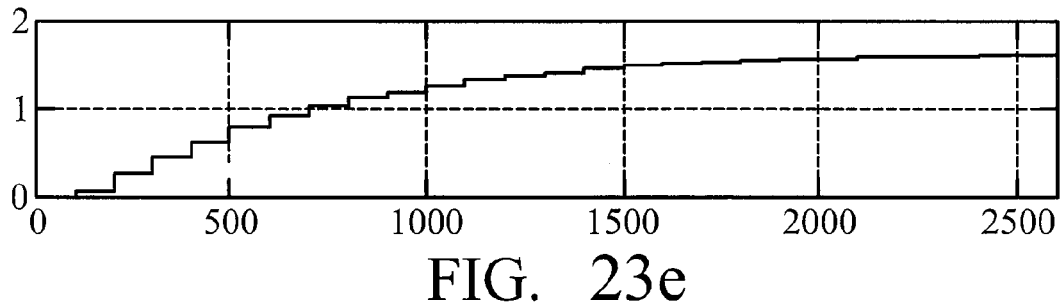
FIG. 23e shows a digital gain signal derived from the difference signal of FIG. 23d by a digital control module of FIG. 22.

FIG. 22 is another block diagram of a digital automatic gain controller 2200 with low sampling rate according to the invention. The digital automatic gain controller 2200 differs from digital automatic gain controller 2000 of FIG. 20 only in the envelope detection module 2202. The envelope detection module 2202 includes a rectifier 2212 and a low pass filter 2214. The rectifier 2212 first generates an absolute value signal I of an amplified signal $S_O$. The low pass filter 2214 then eliminates high frequency noise from the absolute value signal I to obtain the envelope magnitude E. FIG. 23*a* shows an amplified signal $S_O$, and FIG. 23*b* shows an envelope magnitude E derived from the amplified signal $S_O$ of FIG. 23*a* by the envelope detection module 2202. An analog to digital converter 2204 then converts the envelope magnitude to a digital envelope signal shown in FIG. 23*c*. A digital control module 2206 then derives a digital gain signal M from the digital envelope signal E'. FIG. 23*d* shows a difference signal D corresponding to the digital envelope signal E' of FIG. 23*c*, and FIG. 23*e* shows a digital gain signal M derived from the difference signal D of FIG. 23*d* by the digital control module 2206. Finally, a digital to analog converter 2208 converts the digital gain signal M to an analog gain signal M' for the amplification of an input signal $S_I$. Thus, a variable gain amplifier 1910 can then amplify the input signal $S_I$ according to the analog gain signal M' to obtain the amplified signal $S_O$.

Figure 5:
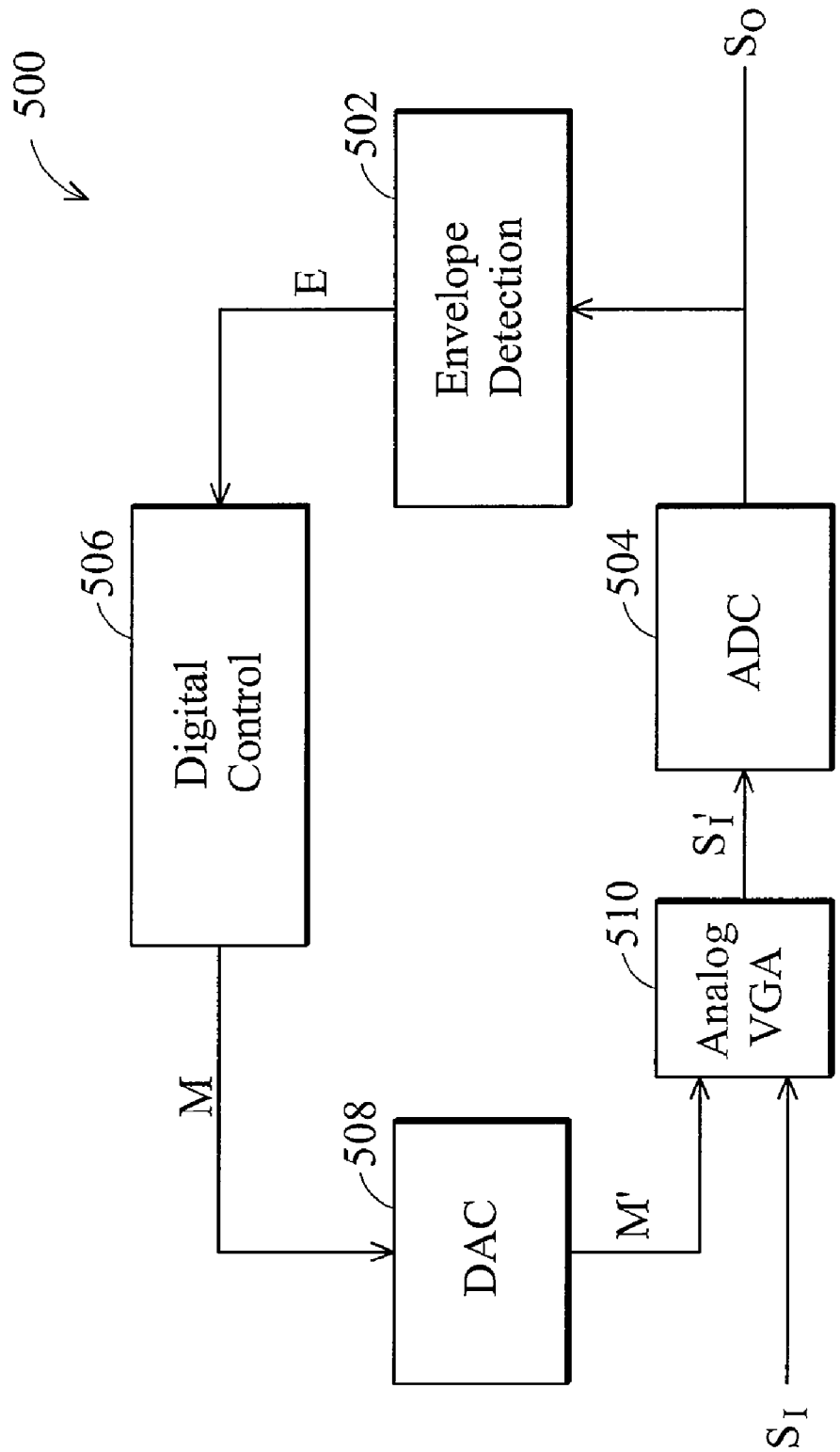
FIG. 5 is a block diagram of a digital automatic gain controller.
Figure 24:
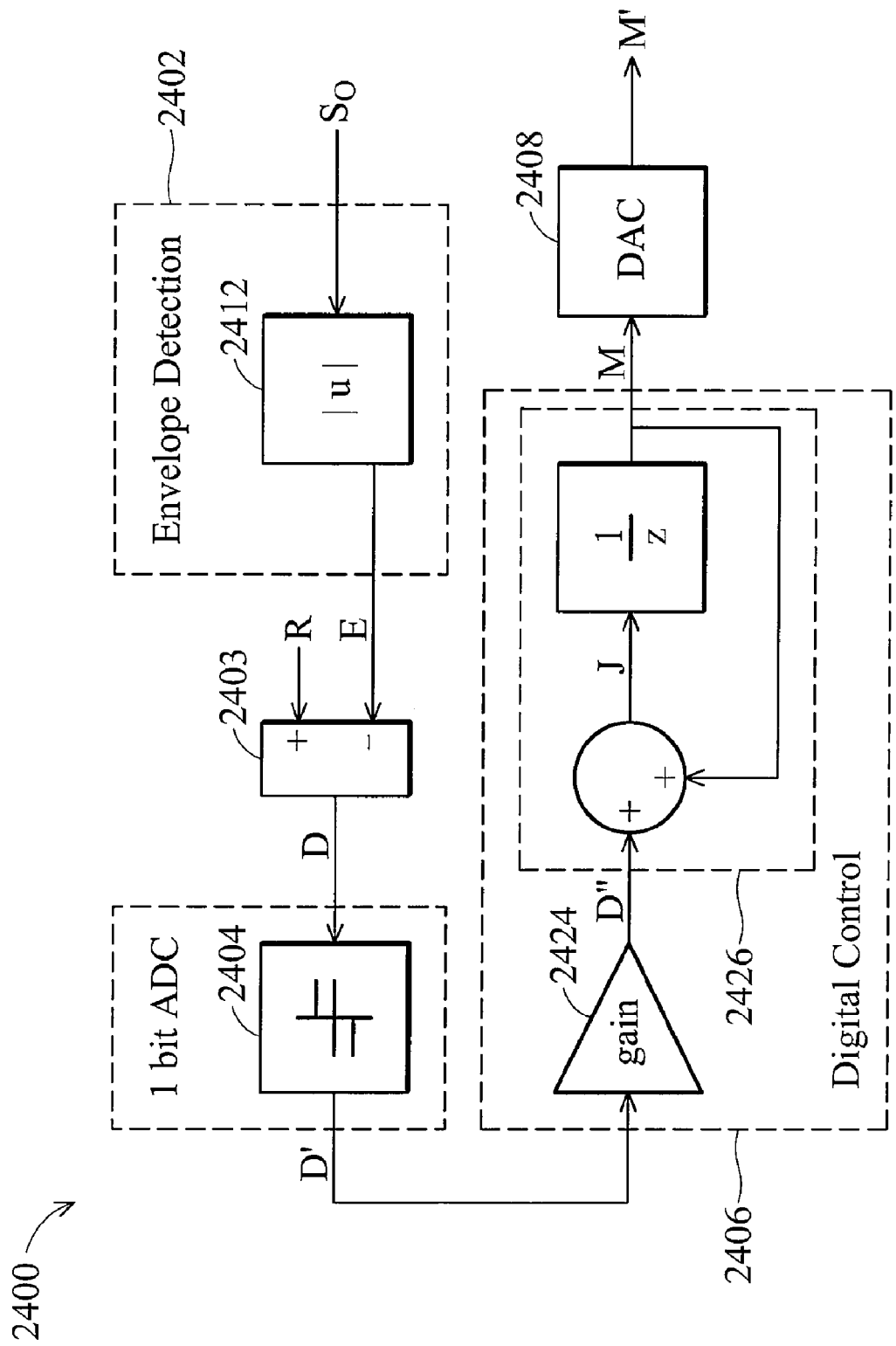
FIG. 24 is a detailed block diagram of a digital automatic gain controller with low signal resolution and high sampling rate according to the invention.

Because input signals of the analog to digital converters 2004 and 2204 are the envelope signals E, the sampling rate of the analog to digital converters 2004 and 2204 is lower than the analog to digital converter 504 of FIG. 5. To obtain precise gain signal, the signal resolution of the analog to digital converters 2004 and 2204 remains high. This can be observed with the digital envelope signals shown in the FIG. 21*b* and FIG. 23*c* with a high signal resolution. The signal resolution, however, can be reduced in the increase of sampling rate. FIG. 24 is a detailed block diagram of a digital automatic gain controller 2400 with low signal resolution and high sampling rate according to the invention.

Figure 25A:
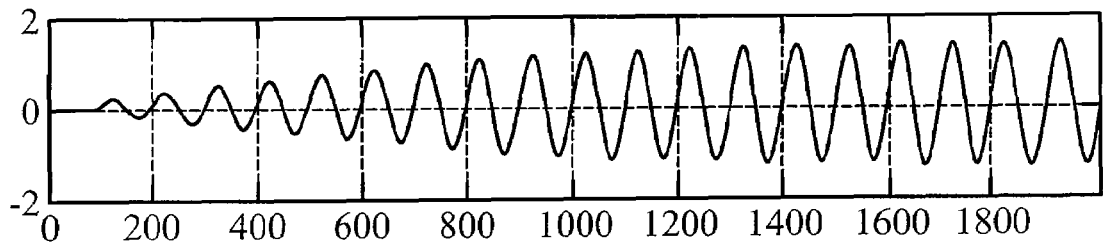
FIG. 25a shows an amplified signal.
Figure 25B:
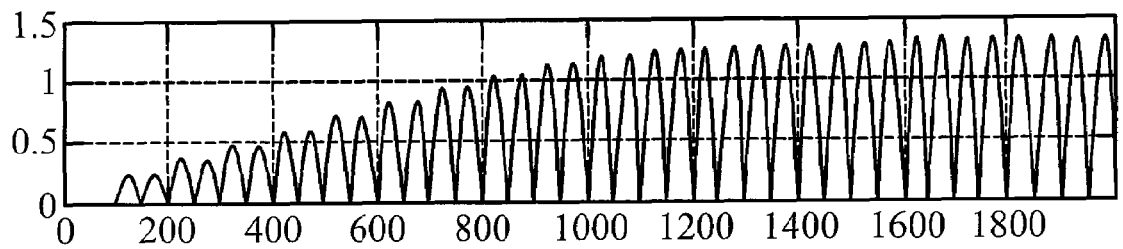
FIG. 25b shows an envelope magnitude derived from the amplified signal of FIG. 25a by a rectifier module of FIG. 24.

The digital automatic gain controller 2400 includes an envelope detection module 2402, an adder 2403, a 1-bit analog to digital converter 2404, a digital control module 2406, a digital to analog converter 2408. The envelope detection module 2402 includes a rectifier 2412 which calculates an absolute value of an amplified signal $S_O$ and outputs the absolute value as an envelope magnitude E. FIG. 25*a* shows an amplified signal $S_O$, and FIG. 25*b* shows an envelope magnitude E derived from the amplified signal $S_O$ of FIG. 25*a* by the rectifier module 2412. The adder 2403 then subtracts the envelope magnitude E from a reference level R to obtain a difference signal D. Because the envelope signal E is not processed by a low pass filter as in FIG. 22, the envelope signal E and the difference signal D oscillate with the frequency of the amplified signal $S_O$. Thus, the 1-bit ADC 2404 convert the analog difference signal D to a 1-bit data stream D' with a sampling frequency more than double the frequency of the amplified signal $S_O$.

Figure 25C:
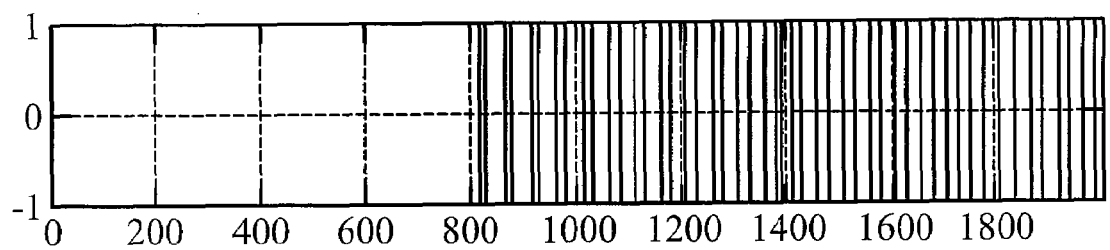
FIG. 25c shows a 1-bit difference data stream corresponding to the envelope magnitude of FIG. 25b.
Figure 25D:
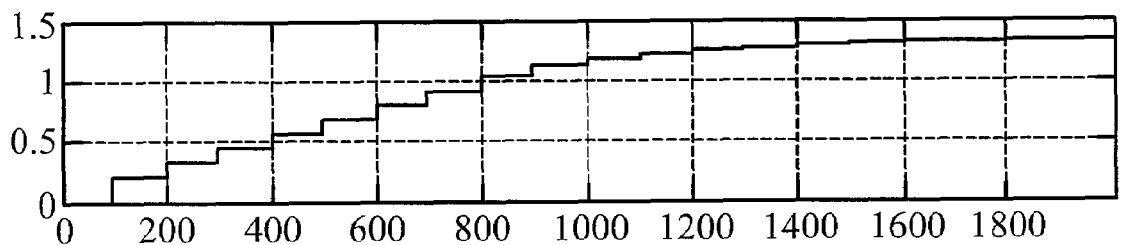
FIG. 25d shows a digital gain signal derived from the difference signal of FIG. 25c by a digital control module of FIG. 24.

FIG. 25c shows a 1-bit difference data stream D' corresponding to the envelope magnitude E of FIG. 25b. Although the sampling rate of the ADC 2404 is high, because the 1-bit data stream D' has only two values, the signal resolution of the 1-bit data stream D' converted by ADC 2404 is lower than the signal resolution of the digital envelope signals E' of ADC 2404 and 2204, as shown in FIGS. 23c and 21b. The difference signal D' in the form of 1-bit data stream is then delivered to the digital control module 2406, which includes a gain controller 2424, and an integrator 2426. The gain controller 2424 first reduces the magnitude of the difference signal D' to a lower level to obtain a difference signal D". The integrator 2426 then integrates the difference signal D" to obtain the digital gain signal M. FIG. 25d shows a digital gain signal M derived from the difference signal D' of FIG. 25c by the digital control module 2406. Finally, a digital to analog converter 2408 converts the digital gain signal M to an analog gain signal M' for amplification of an input signal $S_I$. Thus, a variable gain amplifier 1910 can then amplify the input signal $S_I$ according to the analog gain signal M' to obtain the amplified signal $S_O$.

The invention provides a digital automatic gain controller amplifying a signal. Conventional digital automatic gain controllers process signals at high sample rates and high signal resolution to provide good quality of amplified signals. The digital automatic gain controller provided by the invention, however, can process signals at low sample rates or low signal resolution while obtaining amplified signals of the same quality. The lower sample rates and the lower signal resolution simplify signal processing process and circuit design, improving performance of the digital automatic gain controller and reducing hardware costs.

Figure 26:
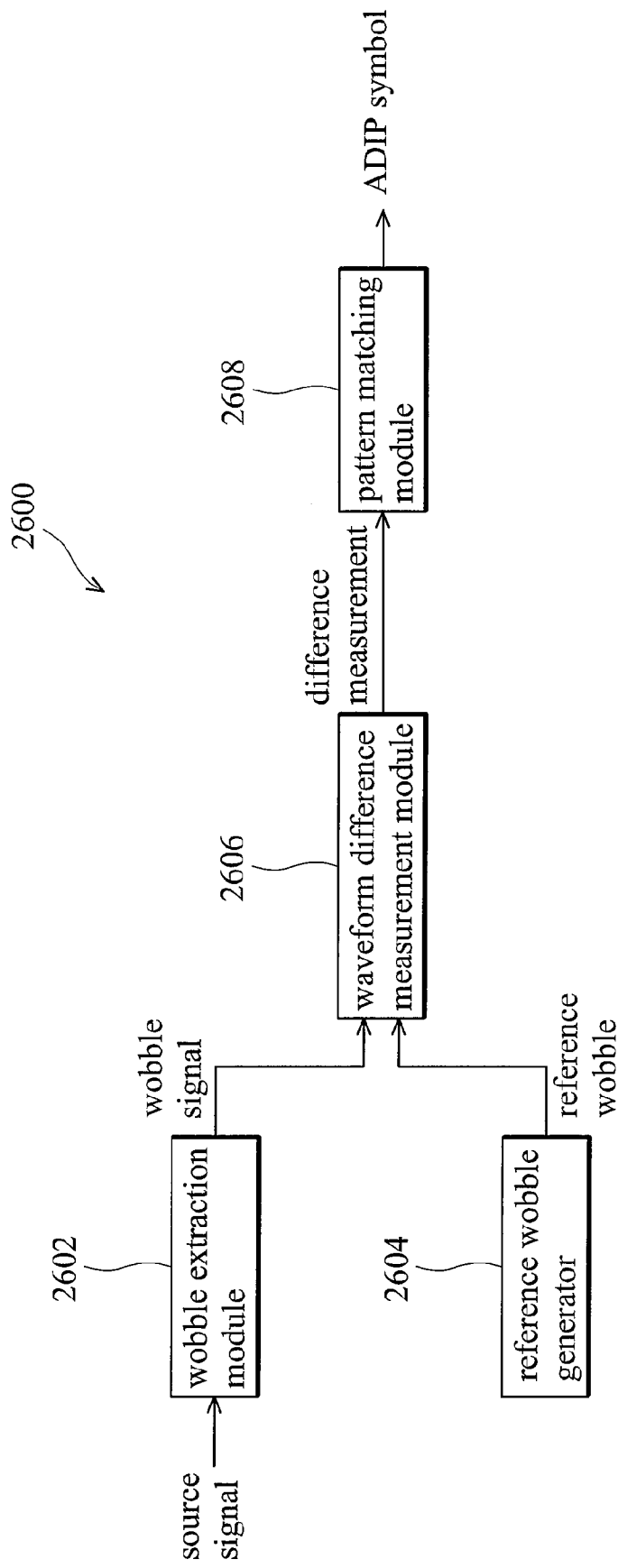
FIG. 26 is a block diagram of an apparatus for demodulating ADIP symbols according to the invention.
Figure 27:
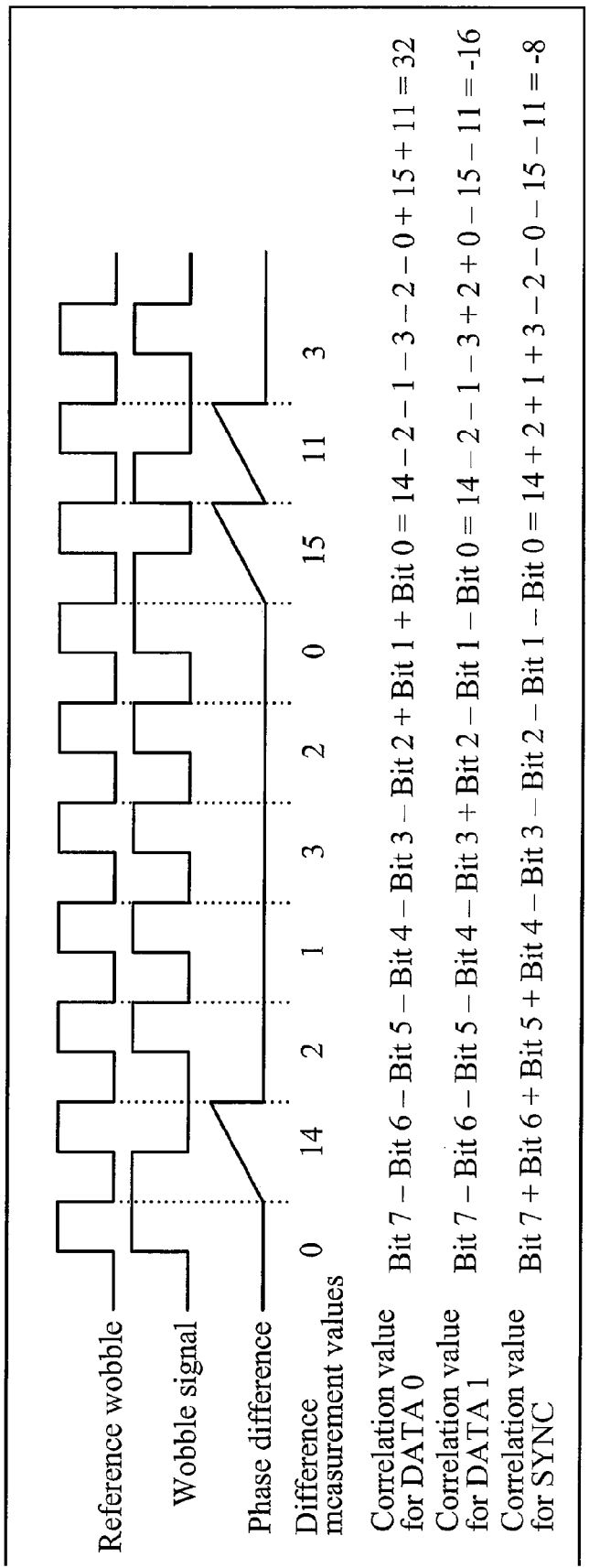
FIG. 27 shows signal processing of demodulating a wobble signal carrying ADIP information into ADIP symbols according to the invention.

FIG. 26 is a block diagram of an apparatus 2600 for demodulating ADIP symbols according to the invention. The apparatus 2600 includes a wobble extraction module 2602, a reference wobble generator 2604, a waveform difference measurement module 2606, and a pattern matching module 2608. The wobble extraction module 2602 first derives a wobble signal from a source signal reflected from the track surface of an optical disk. In one embodiment, the wobble extraction module 2602 is a push-pull processor which subtracts a reflection intensity reflected by one side of a track from another reflection intensity reflected by the other side of the track to obtain the wobble signal. After the wobble signal is generated, the reference wobble generator 2604 generates a reference wobble, with the same frequency and phase as a fundamental frequency and phase of the positive wobble cycle of the wobble signal. Referring to FIG. 27, the first row and second row of FIG. 27 respectively show the waveforms of the reference wobble and the wobble signal. In one embodiment, the reference wobble generator 2604 is a phase lock loop repeating the positive wobble cycle of the wobble signal to generate the reference wobble.

The waveform difference measurement module 2606 then measures a difference between the wobble signal and the reference wobble to obtain a series of difference measurement values. In one embodiment, the difference is a phase difference. Since each difference measurement value is determined according to a corresponding wobble cycle of the wobble signal, each of the difference measurement values therefore respectively corresponds to one ADIP bit. Referring to FIG. 27, the third and fourth rows of FIG. 27 respectively show the phase difference and the obtained difference measurement values. Because the reference wobble has the same phase as that of an positive wobble cycle of the wobble signal, there is almost no difference between a wobble cycle of the wobble signal and the reference wobble if the wobble cycle is a positive wobble cycle, and the obtained difference measurement value is small. Otherwise, if the wobble cycle is a negative wobble cycle, the obtained difference measurement value is large.

Figure 28:
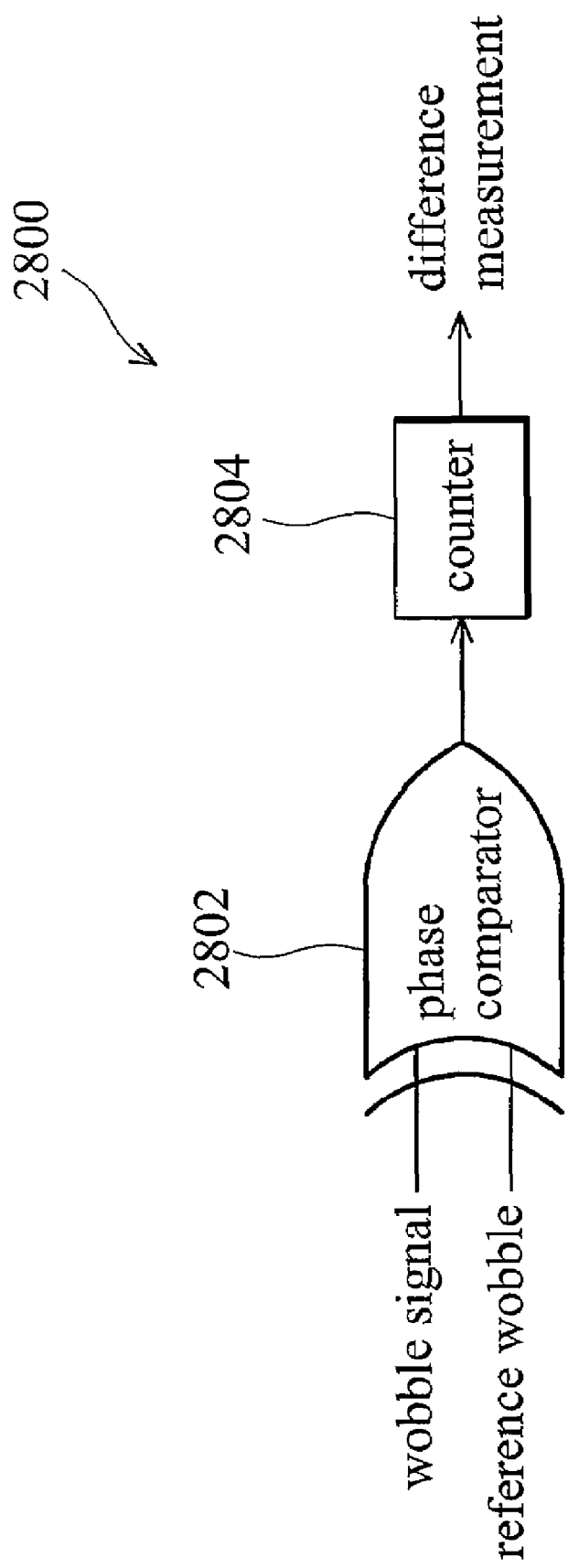
FIG. 28 is a block diagram of a waveform difference measurement module according to the invention.

FIG. 28 is a block diagram of a waveform difference measurement module 2800 according to the invention. The waveform difference measurement module 2800 includes a phase comparator 2802 and a counter 2804. The phase comparator 2802 first compares the phases of the wobble signal and the reference wobble to obtain a phase difference signal. In one embodiment, the phase comparator 2802 is an XOR gate which performs an XOR operation on the wobble signal and the reference wobble to obtain the phase difference signal. Because the XOR gate only generates a high level voltage when both the wobble signal and the reference wobble are at the high level or low level, the generated phase difference signal can appropriately reflect the difference between the wobble signal and the reference wobble. The counter 2804 then counts a high level width of the phase difference signal during each wobble cycle of the reference wobble to generate the difference measurement values corresponding to the ADIP bits. The counter counts the high level width according to a clock signal having a frequency higher than that of the reference wobble. For example, the difference measurement values shown in the fourth row of FIG. 27 can be obtained according to a clock signal with the frequency which is 16 times the wobble cycle frequency of the reference wobble. Thus, the obtained difference measurement values lie between 0 and 16 and reflect the difference levels during each wobble cycle.

Figure 29:
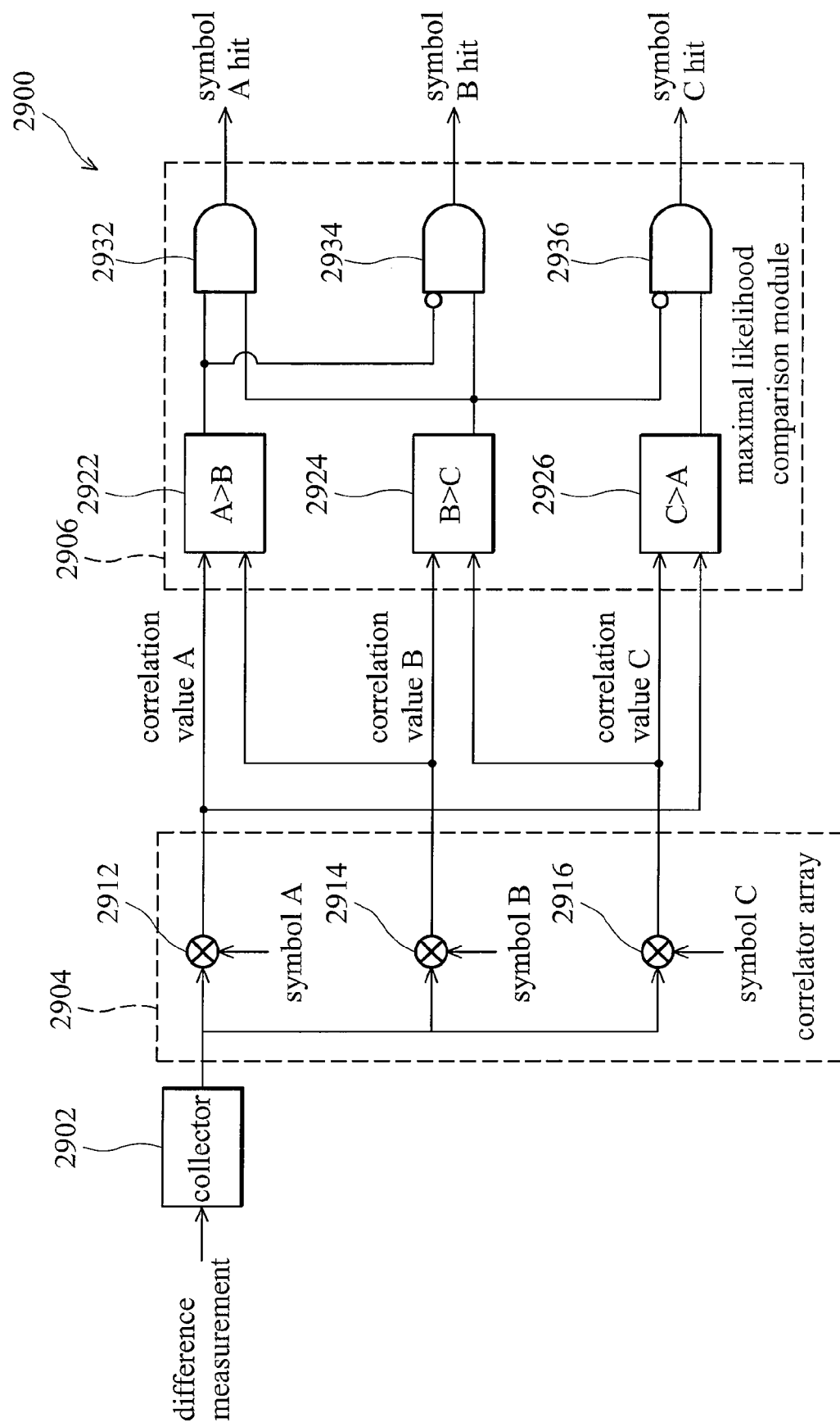
FIG. 29 is a block diagram of a pattern matching module according to the invention.

After the difference measurement values are generated, the pattern matching module 2608 then compares probabilities of the permutation of the ADIP bits agreeing with each of the permutation patterns according to the difference measurement values to determine the ADIP symbols carried by the wobble signal. FIG. 29 is a block diagram of a pattern matching module 2900 according to the invention. The pattern matching module 2900 includes a collector 2902, a correlator array 2904, and a maximum likelihood comparison module 2906. Because each ADIP symbol is composed of eight ADIP bits and the permutation pattern of the eight ADIP bits determines which a ADIP symbol is, the collector 2902 collects eight successive difference measurement values to be compared with the probable permutation patterns of the ADIP bits. The correlator array 2904 includes multiple correlators, each of which correlates the difference measurement values with signs derived from a probable permutation pattern of the ADIP bits to obtain correlation values and then sums the correlation values corresponding to the permutation pattern to obtain the probabilities that the ADIP bits are permutated according to the corresponding permutation pattern.

For example, the eight difference measurement values shown in the fourth row of FIG. 27 are 14, 2, 1, 3, 2, 0, 15, and 11. Because the permutation pattern corresponding to ADIP data 0 symbol is "10000011", the derived correlation values are therefore 14, −2, −1, −3, −2, 0, 15, and 11, and the summation thereof is therefore 32, which indicates the probability that the corresponding ADIP bits represents the ADIP data 0 symbol. The permutation pattern corresponding to ADIP data 1 symbol is "10001100", the derived correlation values are therefore 14, −2, −1, −3, 2, 0, −15, and −11, and the probability that the corresponding ADIP bits represents the ADIP data 1 symbol is therefore −16. Accordingly, the permutation pattern corresponding to ADIP synch symbol is "11110000", and the probability that the corresponding ADIP bits represents the ADIP synch symbol is therefore −8.

Figure 6A:
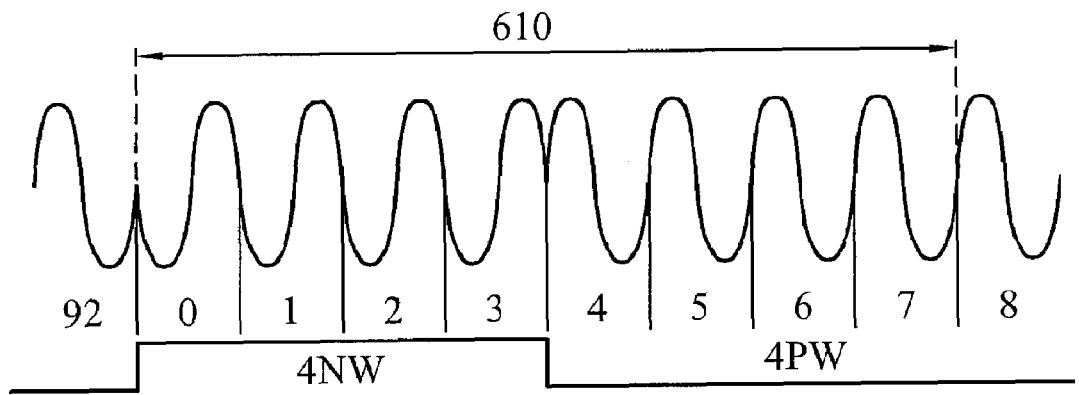
FIG. 6A shows a wobble signal carrying an ADIP synch symbol.
Figure 6B:
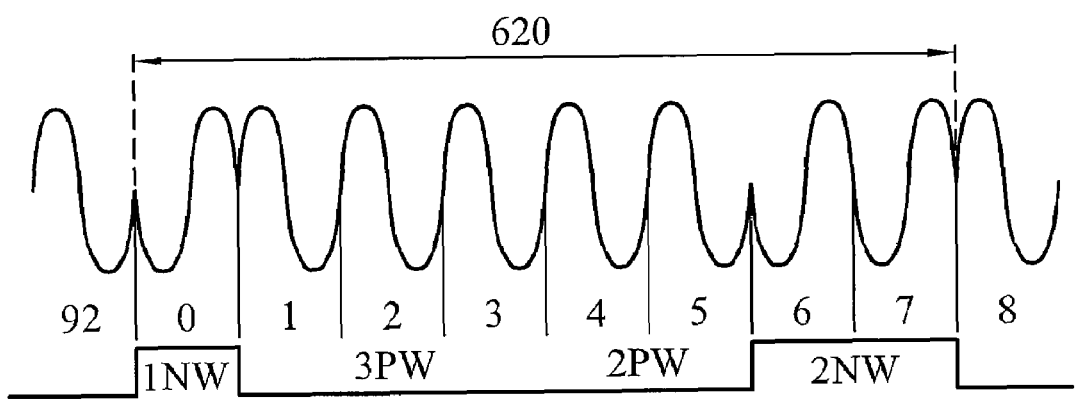
FIG. 6B shows a wobble signal carrying an ADIP data 0 symbol.
Figure 6C:
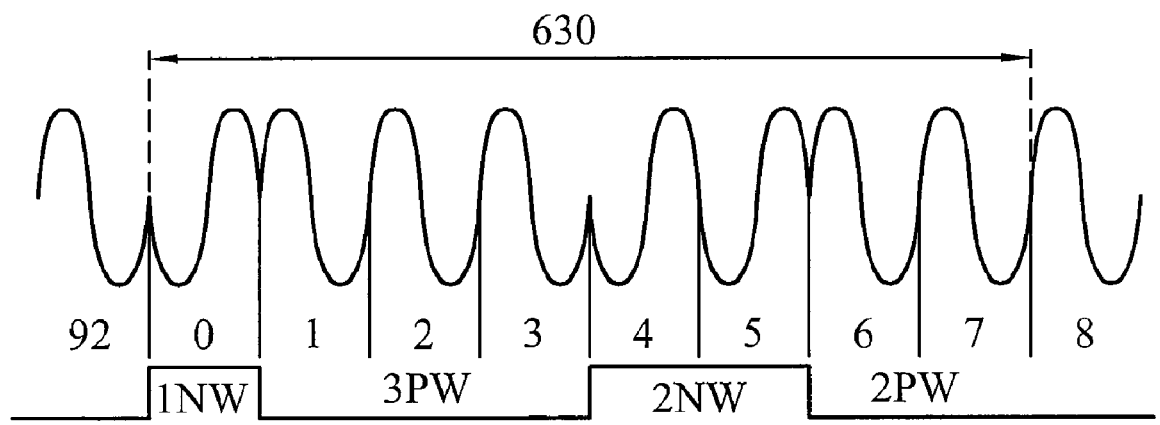
FIG. 6C shows a wobble signal carrying an ADIP data 1 symbol.
Figure 7:
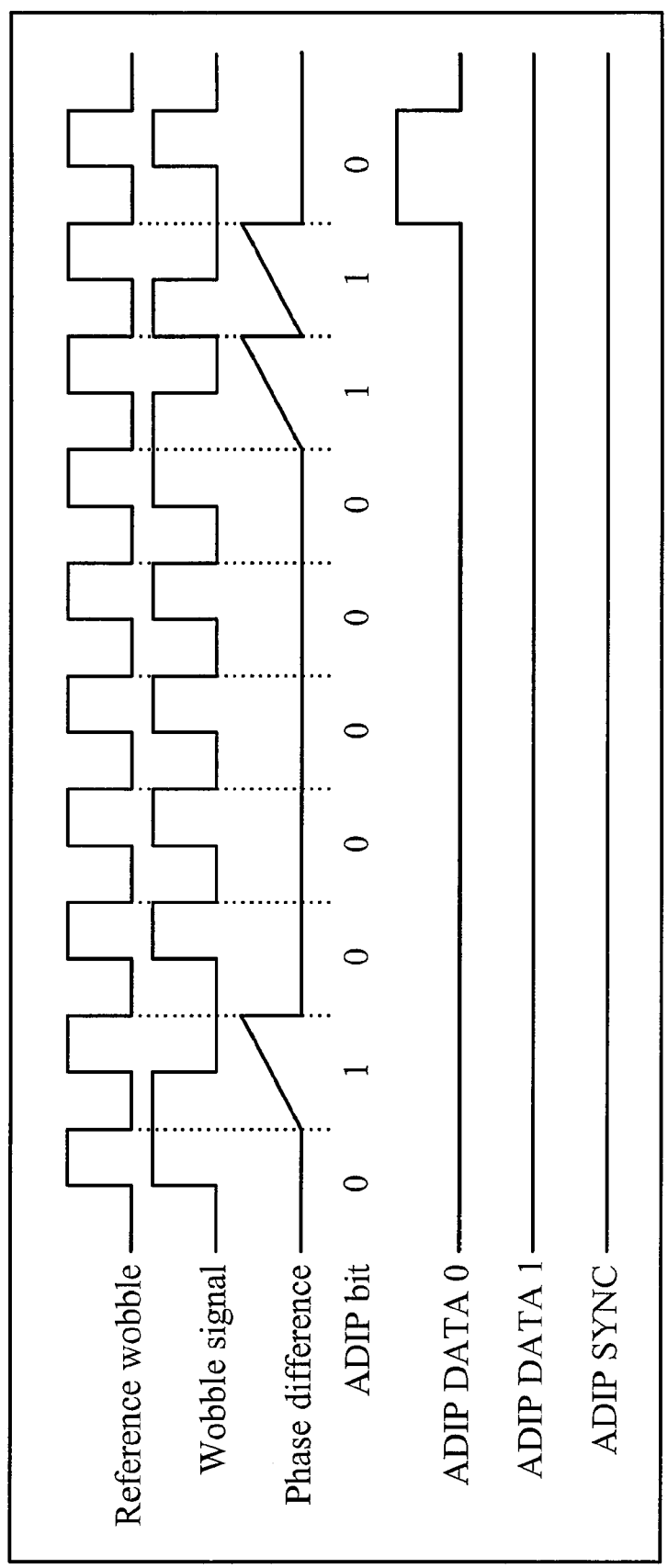
FIG. 7 shows a conventional process of demodulating a wobble signal carrying ADIP information into ADIP symbols.
Figure 8:
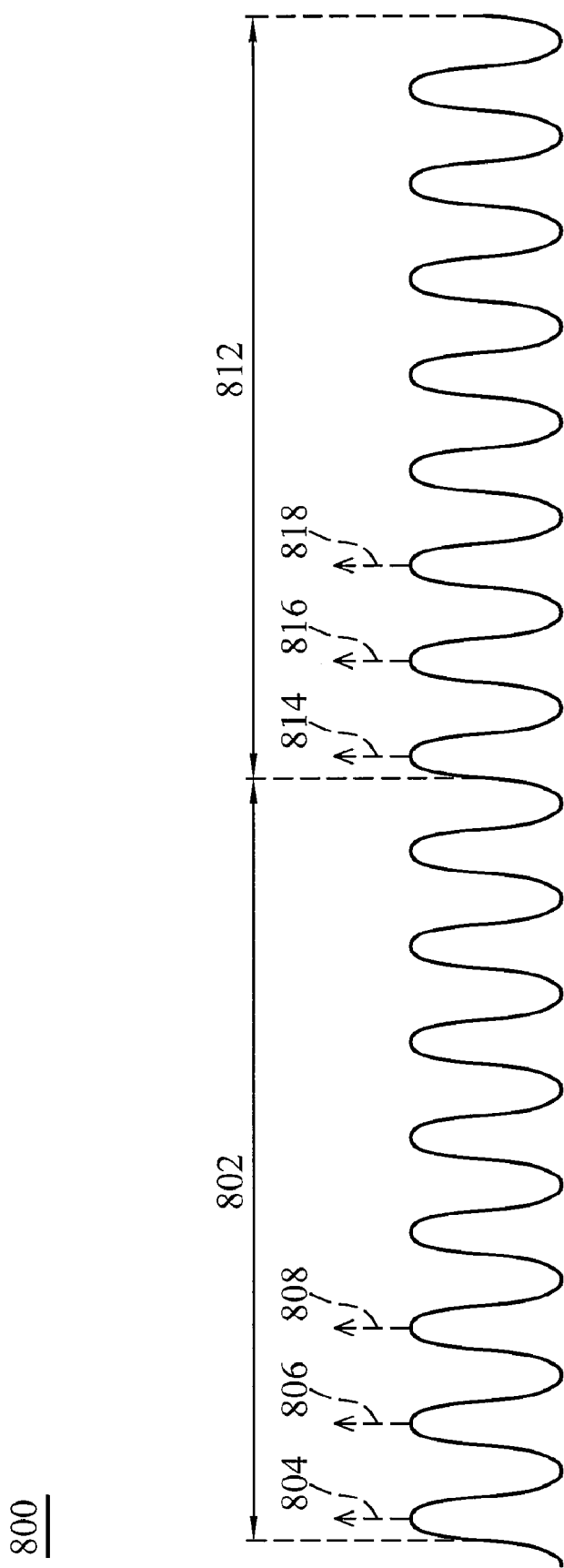
FIG. 8 shows pre-pit bits associated with a wobble signal of two successive frames.

The maximum likelihood comparison module 2906 then compares the probabilities corresponding to the permutation patterns to determine the ADIP symbol. The maximum likelihood comparison module 2906 includes three comparators 2922, 2924, and 2926 and three AND gates 2932, 2934, and 2936. The comparators 2922, 2924 and 2926 respectively compare two of the three probabilities generated by the correlator array 2904 to determine comparison results indicating the larger of the two probabilities. Each of the AND gates 2932, 2934, and 2936 then performs an AND operation on two of the comparison results to determine which of the permutation patterns has the largest probability, and the permutation pattern with the largest probability determines the ADIP symbol. For example, if the probabilities corresponding to the ADIP data 0 symbol, the ADIP data 1 symbol, and the ADIP synch symbol in FIG. 6 are respectively 32, −16, and −8, the largest probability of 32 indicates that the ADIP symbol is an ADIP data 0 symbol.

Figure 30:
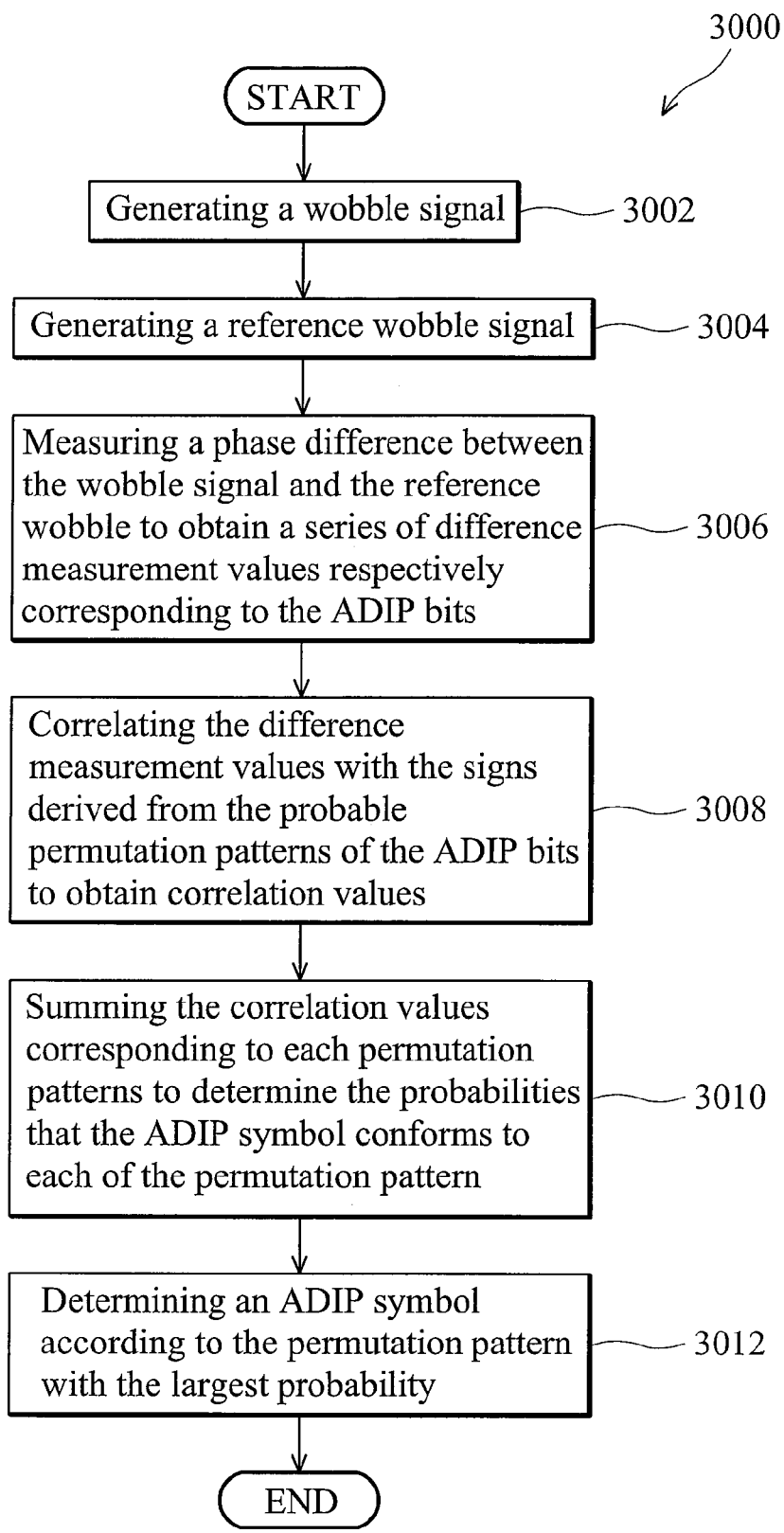
FIG. 30 is a flowchart of a method for demodulating ADIP symbols according to the invention.

FIG. 30 is a flowchart of a method 3000 for demodulating ADIP symbols according to the invention. First, a wobble signal is generated at step 3002. A reference wobble with the same frequency and phase as a fundamental frequency and phase of a positive wobble cycle of the wobble signal is then generated at step 3004. A phase difference between the wobble signal and the reference wobble is then measured at step 3006 to obtain a series of difference measurement values respectively corresponding to the ADIP bits. The difference measurement values are then correlated with the signs derived from the probable permutation patterns of the ADIP bits to obtain correlation values at step 3008, and the correlation values corresponding to each permutation patterns are then summed to determine the probabilities that the ADIP symbol conforms to each of the permutation pattern at step 3010. Finally, an ADIP symbol is determined according to the permutation pattern with the largest probability at step 3012.

Figure 31:
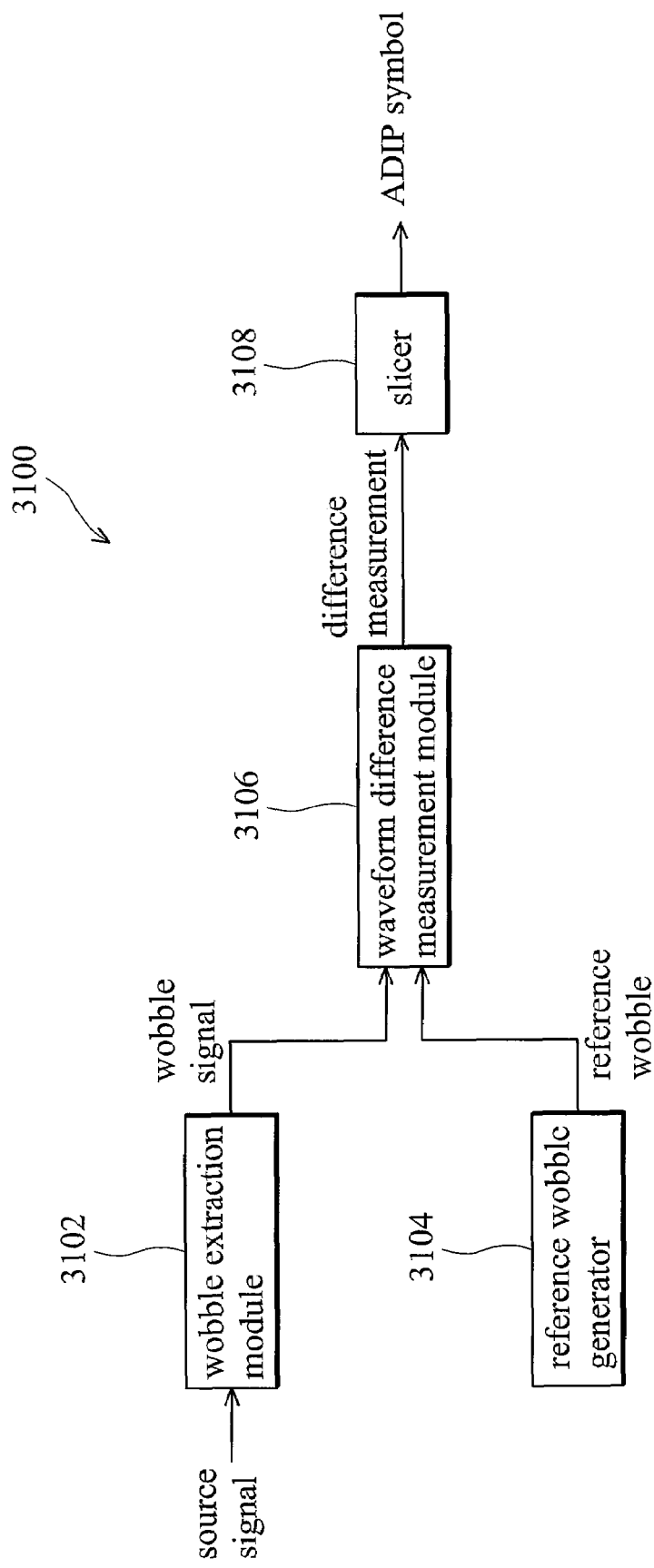
FIG. 31 is a block diagram of an apparatus for demodulate ADIP symbols of HD-DVD disks according to the invention.

The method 3000 not only demodulates the ADIP symbols of optical disks with the format of DVD+R or DVD+RW, but can further be applied to demodulate ADIP symbols of HD-DVD optical disks. According to the HD-DVD specification, the ADIP symbol is made up of a single ADIP bit which may be a Normal Phase Wobble (NPW) or an Invert Phase Wobble (IPW). Thus, the pattern matching module 2608 of the apparatus 2600 is substituted by a slicer to generate the ADIP symbol, because a single ADIP bit has only two selective permutations of NPW or IPW, which can be determined by only a slicer or a decision maker [no shown]. FIG. 31 shows the apparatus 3100 for demodulate ADIP symbols of HD-DVD disks according to the invention. Except for the slicer 3108, all other three elements of the apparatus 3100 are substantially the same as the corresponding ones of the apparatus 2600.

Figure 32:
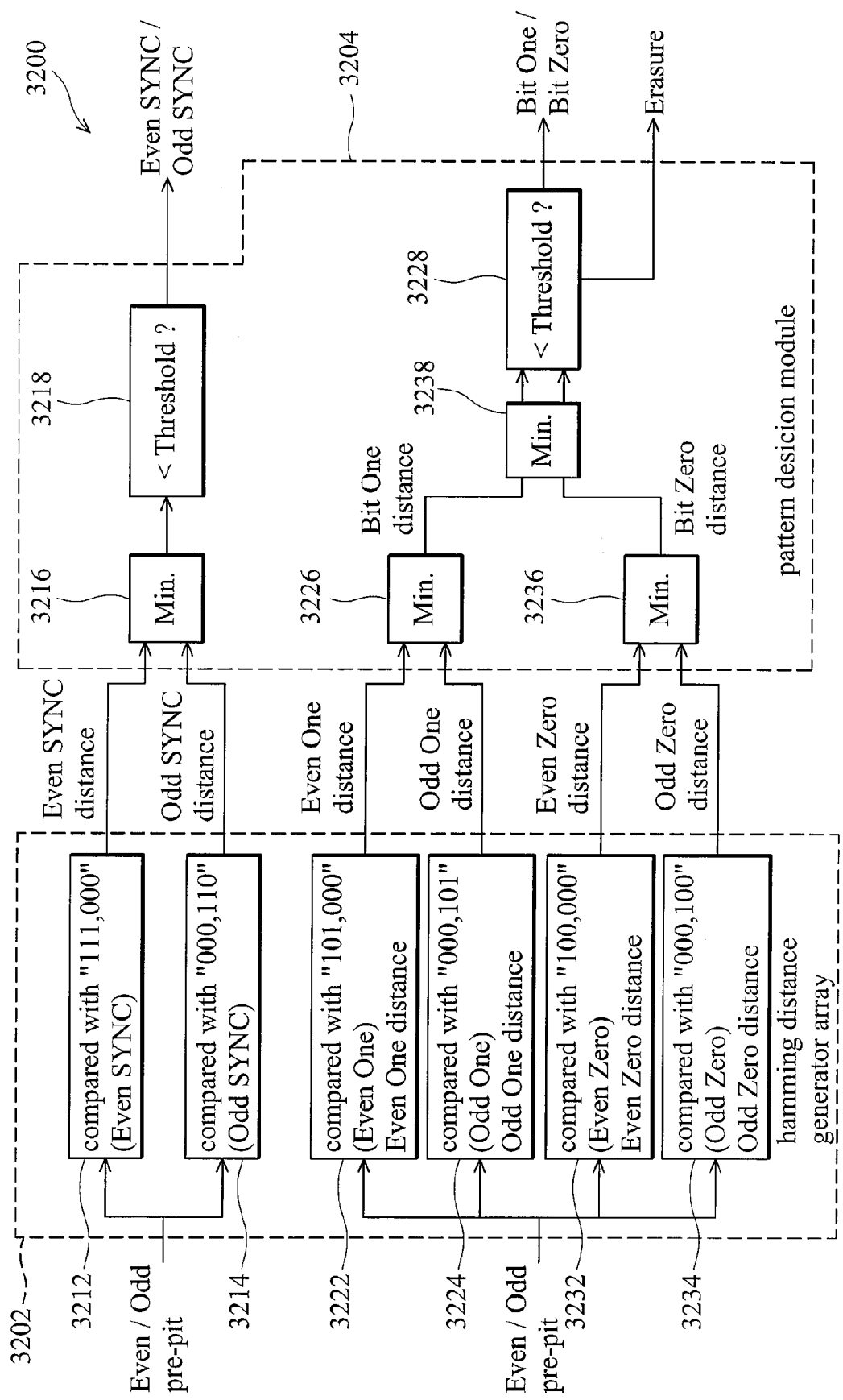
FIG. 32 is a block diagram of the apparatus for demodulating pre-pit symbols according to the invention.

Based on the principle of the apparatus 2600 for demodulating ADIP symbols, an apparatus 3200 for demodulating pre-pit symbols is provided. FIG. 32 is a block diagram of the apparatus 3200 for demodulating pre-pit symbols according to the invention. The apparatus 3200 includes a pre-pit bit collection module (not shown in FIG. 32), a hamming distance generator array 3202, and a pattern decision module 3204. A wobble signal carrying pre-pit bits is first extracted from an optical disk. Because the pre-pit bits only appear at either an odd frame or an even frame of the wobble signal, the pre-pit bit collection module then collects the pre-pit bits appearing at both an odd frame and an even frame to obtain a pre-bit bit set. Referring to FIG. 9, the three pre-pit bits have "111" permutation pattern for pre-pit synch symbol in even frame, "110" permutation pattern for pre-pit synch symbol in odd frame, "101" permutation pattern for pre-pit data 1 symbol, or "100" permutation pattern for pre-pit data 0 symbol. Thus, if the pre-pit bit collection module collects pre-pit bits in the order of an even frame followed by an odd frame, there may be six type of permutation patterns of the pre-pit bits collected by the pre-pit bit collection module: "111000" for pre-pit synch symbol in even frame, "000110" for pre-pit synch symbol in odd frame, "101000" for pre-pit data 1 symbol in even frame, "000101" for pre-pit data 1 symbol in odd frame, "100000" for pre-pit data 0 symbol in even frame, and "000100" for pre-pit data 0 symbol in odd frame.

The hamming distance generator array 3202 then measures a plurality of hamming distances between the pre-pit bits of the pre-bit set and each of the permutation patterns, "111000", "000110", "101000", "000101", "100000", and "000100". The hamming distance generator array 3202 includes a plurality of hamming distance generators 3212, 3214, 3222, 3224, 3232, and 3234, each of which measures a hamming distance between the pre-pit bits of the pre-bit set and one of the permutation patterns. Because a hamming distance indicates the number of bits located at the same location of two strings but having different values, the hamming distance appropriately reflects the probability that the pre-pit bits represent a pre-pit symbol, just like the sum of the correlation values generated by the correlator array 2912 in FIG. 29. The pattern decision module 3204 then finds the permutation pattern having a minimum of the hamming distances to determine the pre-pit symbol represented by the pre-pit bits. Thus, the pre-pit symbol is determined.

The invention provides methods for demodulating ADIP symbols and pre-pit symbols carried by a wobble signal. The ADIP symbols record addressing information for optical disks with the format of DVD+R or DVD+RW, and the pre-pit symbols record addressing information for optical disks with the format of DVD-R or DVD-RW. Because the probabilities that the ADIP bits or the pre-pit bits agree with the specific permutations of probable ADIP symbols or pre-pit symbols are appropriately measured with sums of correlation values or hamming distances to determine the output ADIP symbols or pre-pit symbols, the noise tolerance of the methods provided by the invention is much higher than that of conventional methods, and the performance and precision of the demodulation of ADIP symbols and pre-pit symbols are greatly improved.

Figure 33A:
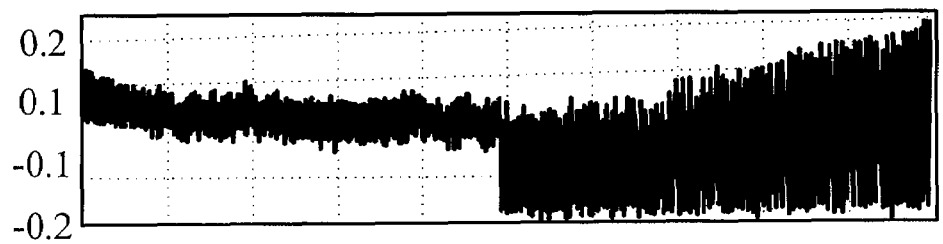
FIG. 33a shows signal $S_{AD}$ and FIG. 33b show shows signal $S_{BC}$.
Figure 33B:
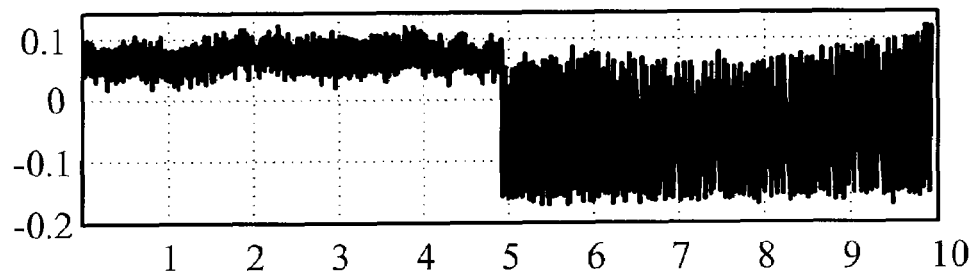

Please refer to FIGS. 33*a* and 33*b*. FIGS. 33*a* and 33*b* respectively show the exemplary synthesized signals $S_{AD}$ and $S_{BC}$ retrieved from blank sectors and non-blank sectors. As disclosed above, a pick-up head detects four reflection signals $S_A$, $S_B$, $S_C$, and $S_D$ reflected from an optical disk, wherein signals $S_A$, $S_D$ and signals $S_B$, $S_C$ are respectively representing light intensity reflected from the opposite sides of a track. The reflection signals $S_A$ and $S_D$ are then added to obtain a signal $S_{AD}$ and the reflection signals $S_B$ and $S_C$ are then added to obtain a signal $S_{BC}$. The left segment of FIGS. 33*a* and 33*b* represents intensity of reflected light from corresponding blank sectors, and the right segment of FIGS. 33*a* and 33*b* represents intensity of reflected light from corresponding non-blank sectors.

Figure 33C:
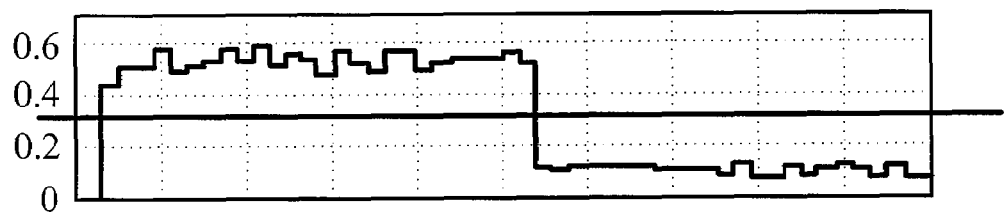
FIG. 33c shows a wobble peak signal drives by a peak detection unit of FIG. 34.
Figure 33D:
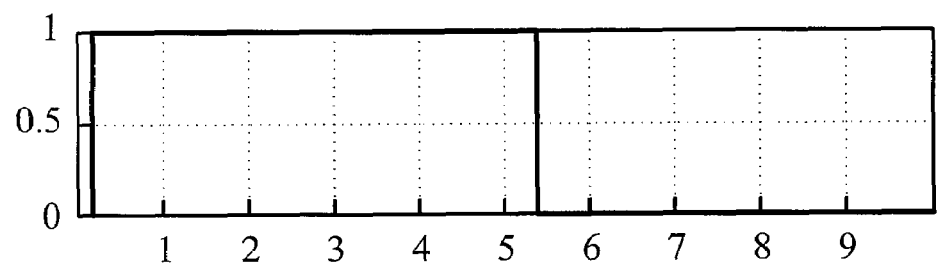
FIG. 33d shows a blank detection signal.
Figure 34:
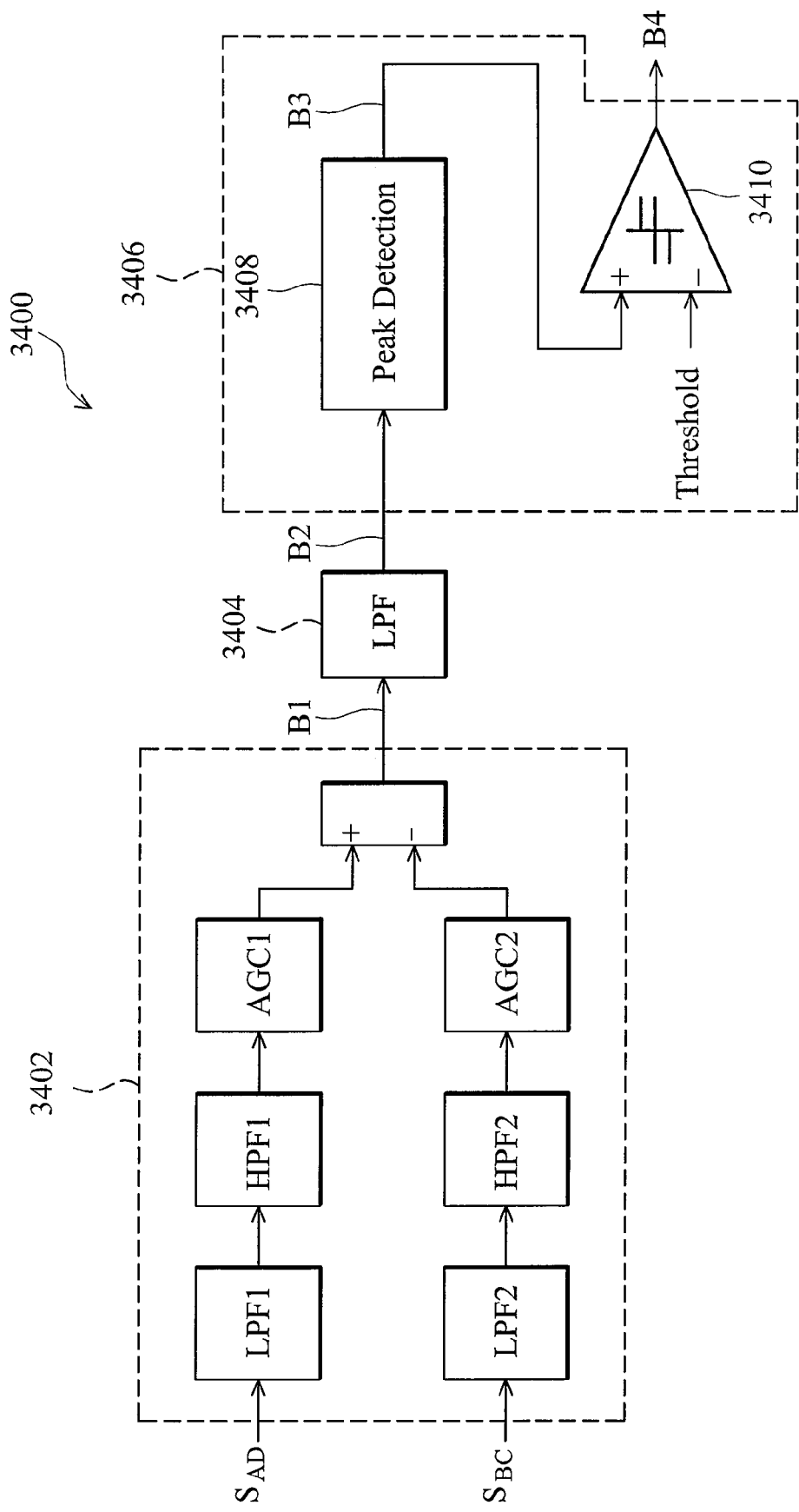
FIG. 34 is an exemplary block diagram of an apparatus for detecting the blank sector on an optical disk using the wobble signals.

Please refer to FIG. 33*c*, FIG. 33*d* and FIG. 34. FIG. 33*c* shows a wobble peak signal drives by a peak detection unit of FIG. 34. FIG. 33*d* shows a blank detection signal. FIG. 34 is an exemplary block diagram of an apparatus 3400 for detecting the blank sector on an optical disk using the wobble signals. Apparatus 3400 includes a push-pull processor 3402, similar to push-pull processor 1302 in FIG. 13, for generating the wobble signal B1, a low pass filter 3404 for filtering high frequency noises to generate a filtered wobble signal B2, and a blank detection module 3406 receiving the filtered wobble signal B2 for generating a blank detection signal to determining the corresponding blank sectors of the optical disk. The blank detection module 3406 further includes a peak detection unit 3408 for detecting envelop of the filtered wobble signal B2 to generate wobble peak signal B3, as shown in FIG. 33c. In addition, a comparator 3410 compares the filtered wobble signal B2 with a threshold value to generate the blank signal B4, as Shown in FIG. 33d. The comparator 3410 can be a slicer or a decision maker, thus the blank detection apparatus determines the corresponding blank sectors of the optical disk in accordance with the wobble signals.

Because the wobble signal B1 is generated by subtracting the signal $S_{BC}$ from signal $S_{AD}$, the problem of diverse amplitude levels of RF signal between various disks is solved. Therefore, the unick threshold value of the comparator can utilized for various disks.

Figure 35:
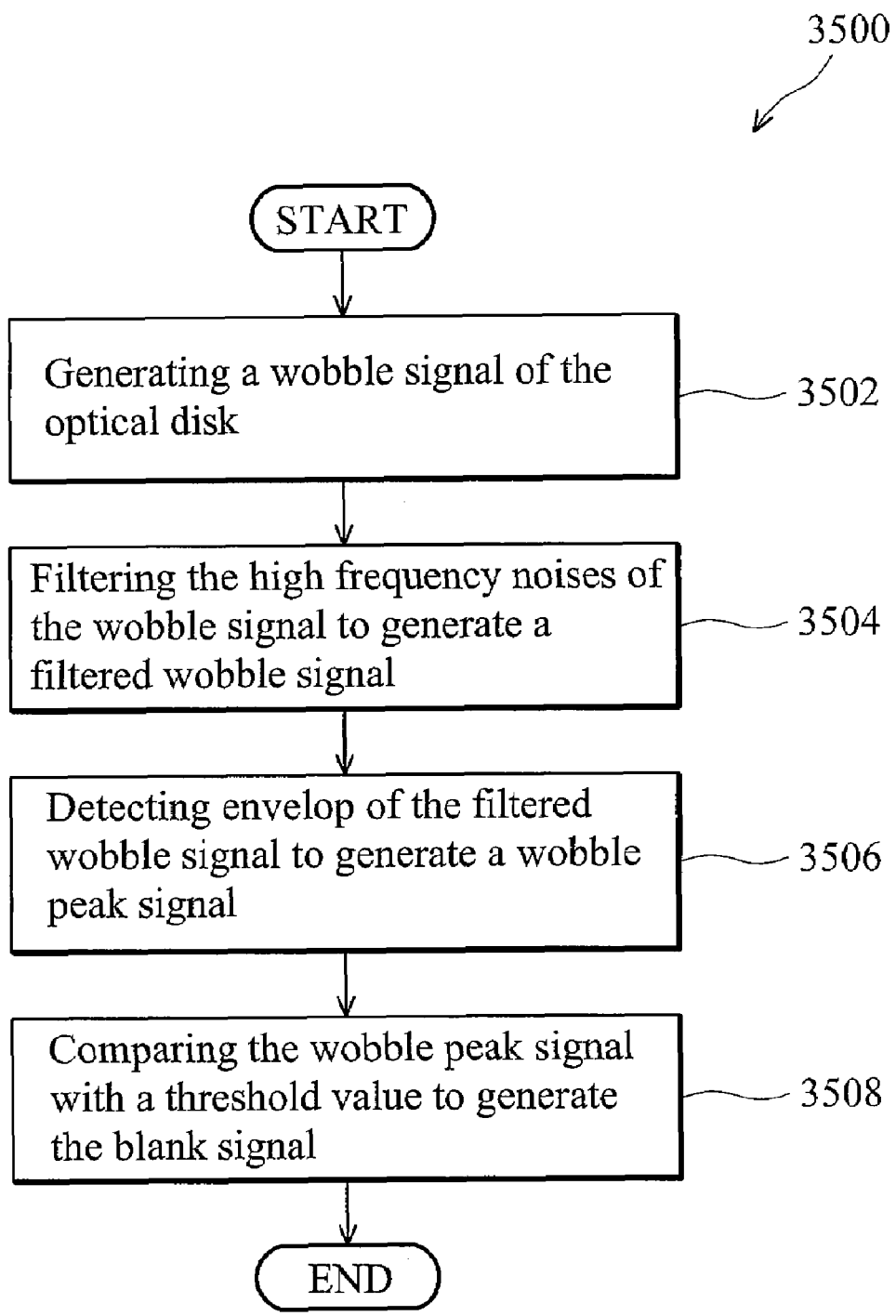
FIG. 35 is a flow chart of the blank detection method.

FIG. 35 is a flow chart of the blank detection method. In step 3502, a push-pull processor generates a wobble signal of the optical disk. The high frequency noises of the wobble signal are filtered to generate a filtered wobble signal in step 3504. Then, in step 3506, a peak detection unit detect envelop of the filtered wobble signal to generate wobble peak signal. Finally, in step 3508, a comparator compares the wobble peak signal with a threshold value to generate the blank signal. The blank signal determines the corresponding blank sectors of the optical disk.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for demodulating an Address In Pre-groove (ADIP) symbol, wherein the ADIP symbol is carried by a wobble signal of an optical disk and comprises a series of ADIP bits permuted according to one of a plurality of permutation patterns to make up the ADIP symbol, the apparatus comprising:
    a wobble extraction module, extracting the wobble signal from the optical disk;
    a reference wobble generator, generating a reference wobble with the same frequency and phase as a fundamental frequency and phase of a positive wobble cycle of the wobble signal;
    a waveform difference measurement module, coupled to the wobble extraction module and the reference wobble generator, measuring a difference between the wobble signal and the reference wobble to obtain a series of difference measurement values respectively corresponding to the ADIP bits; and
    a pattern matching module, coupled to the waveform difference measurement module, comparing probabilities of the permutation of the ADIP bits agreeing with each of the permutation patterns according to the difference measurement values to determine the ADIP symbol.

2. The apparatus as claimed in claim 1, wherein the waveform difference measurement module comprises:
    an phase comparator, coupled to the wobble extraction module and the reference wobble generator, comparing the phases of the wobble signal and the reference wobble to obtain a phase difference signal; and
    a counter, coupled to the phase comparator, counting a high level width of the phase difference signal during each wobble cycle of the reference wobble to generate the difference measurement values corresponding to the ADIP bits.

3. The apparatus as claimed in claim 2, wherein the counter counts the high level width according to a clock signal having a frequency higher than that of the reference wobble.

4. The apparatus as claimed in claim 1, wherein the pattern matching module includes:
    a collector, coupled to the waveform difference measurement module, collecting the difference measurement values making up the ADIP symbol;
    a correlator array, coupled to the collector, correlating the difference measurement values with signs derived from the permutation patterns to obtain correlation values and respectively summing the correlation values corresponding to each permutation patterns to obtain the probabilities that the ADIP symbol conforms to each of the permutation patterns; and
    a maximum likelihood comparison module, coupled to the correlator array, comparing the probabilities corresponding to the permutation patterns to determine the ADIP symbol.

5. The apparatus as claimed in claim 4, wherein the correlator array includes a plurality of correlators respectively generating the probabilities corresponding to the permutation patterns, and the maximum likelihood comparison module includes:
    a plurality of comparators, respectively coupled to two of the correlators, determining a plurality of comparison results indicating the larger of two of the probabilities; and
    a plurality of AND gates, respectively coupled to two of the comparators, performing an AND operation on two of the comparison results to determine with which of the permutation patterns the ADIP symbol agrees.

6. The apparatus as claimed in claim 1, wherein the reference wobble generator is a phase lock loop repeating a positive wobble cycle of the wobble signal to generate the reference wobble.

7. The apparatus as claimed in claim 1, wherein the wobble extraction module is a push-pull processor subtracting a first reflection intensity reflected by one side of a track from a second reflection intensity reflected by the other side of the track to obtain the wobble signal.

8. The apparatus as claimed in claim 1, wherein the format of the optical disk is HD-DVD according to which the ADIP symbol is made up of only one ADIP bit and there are only two permutation patterns including Normal Phase Wobble (NPW) and Invert Phase Wobble (IPW), and the pattern matching module is a slicer determining the ADIP symbol according to only one difference measurement value.

9. The apparatus as claimed in claim 1, wherein the format of the optical disk is DVD+R or DVD+RW according to which the ADIP symbol is made up of eight ADIP bits and there are three permutation patterns including SYNCH, data 0 and data 1.

10. A method for demodulating an Address In Pre-groove (ADIP) symbol, wherein the ADIP symbol is carried by a wobble signal of an optical disk and comprises a series of ADIP bits permuted according to one of a plurality of permutation patterns to make up the ADIP symbol, the method comprising:
    extracting the wobble signal from the optical disk;

generating a reference wobble with the same frequency and phase as a fundamental frequency and phase of a positive wobble cycle of the wobble signal;

measuring a difference between the wobble signal and the reference wobble to obtain a series of difference measurement values respectively corresponding to the ADIP bits; and comparing probabilities of the permutation of the ADIP bits agreeing with each of the permutation patterns according to the difference measurement values to determine the ADIP symbol.

11. The method as claimed in claim 10, wherein the measurement of the difference includes:

performing an XOR operation on the wobble signal and the reference wobble to obtain a phase difference signal; and counting a high level width of the phase difference signal during each wobble cycle of the reference wobble to generate the difference measurement values corresponding to the ADIP bits.

12. The method as claimed in claim 10, wherein the comparison of the probabilities includes:

collecting the difference measurement values making up the ADIP symbol;

correlating the difference measurement values with signs derived from the permutation patterns to obtain correlation values and respectively summing the correlation values corresponding to each permutation pattern to obtain the probabilities that the ADIP symbol conforms to each of the permutation patterns; and comparing the probabilities corresponding to the permutation patterns to determine the ADIP symbol.

13. The method as claimed in claim 12, wherein the comparison of the probabilities further includes:

determining a plurality of comparison results indicating the larger of two of the probabilities; and performing an AND operation on two of the comparison results to determine with which of the permutation patterns the ADIP symbol agrees.

14. The method as claimed in claim 10, wherein the extraction of the wobble signal includes subtracting a first reflection intensity reflected by one side of a track from a second reflection intensity reflected by the other side of the track.

15. The method as claimed in claim 10, wherein the format of the optical disk is DVD+R or DVD+RW according to which the ADIP symbol is made up of eight ADIP bits and there are three permutation patterns including SYNCH, data 0 and data 1.

16. An apparatus for decoding a pre-pit symbol, wherein the pre-pit symbol is carried by a wobble signal of an optical disk and comprises a series of pre-pit bits permuted according to one of a plurality of permutation patterns to make up the pre-pit symbol, the apparatus comprising:

a pre-pit bit collection module, collecting the pre-pit bits appearing at both an odd frame and an even frame of the wobble signal to obtain a pre-bit bit set, wherein the pre-pit bits of the pre-pit symbol only appear at either the odd or even frame;

a hamming distance generator array, coupled to the pre-pit bit collection module, measuring a plurality of hamming distances between the pre-pit bits of the pre-bit set and each of the permutation patterns;

a pattern decision module, coupled to the hamming distance generator array, finding the permutation pattern having a minimum of the hamming distances to determine the pre-pit symbol.

17. The apparatus as claimed in claim 16, wherein the hamming distance generator array includes a plurality of hamming distance generators, each of which measures a hamming distances between the pre-pit bits of the pre-bit set and one of the permutation patterns.

18. The apparatus as claimed in claim 17, wherein the hamming distance generators respectively measure a hamming distance between the pre-pit bits of the pre-bit sets and a permutation pattern selected from "111000", "000110", "101000", "000101", "110000", and "000110", which respectively indicates the permutation patterns of a SYNCH symbol appearing at the odd frame, a SYNCH symbol appearing at the even frame, a data 1 symbol appearing at the odd frame, a data 0 symbol appearing at the odd frame, a data 0 symbol appearing at the odd frame, and a data 0 symbol appearing at the even frame.

19. The apparatus as claimed in claim 16, wherein the permutation patterns include a SYNCH symbol appearing at the odd frame, a SYNCH symbol appearing at the even frame, a data 1 symbol, and a data 0 symbol.

20. The apparatus as claimed in claim 16, wherein the format of the optical disk is DVD-R or DVD-RW.

* * * * *